United States Patent [19]

Togano et al.

[11] Patent Number: 5,139,697
[45] Date of Patent: Aug. 18, 1992

[54] LIQUID CRYSTAL COMPOSITION AND LIQUID CRYSTAL DEVICE USING SAME

[75] Inventors: Takeshi Togano, Yokohama; Masahiro Terada, Atsugi; Masataka Yamashita, Hiratsuka; Shosei Mori, Atsugi; Takashi Iwaki, Isehara, all of Japan

[73] Assignee: Canon Kabushiki Kaisha, Tokyo, Japan

[21] Appl. No.: 711,566

[22] Filed: May 30, 1991

Related U.S. Application Data

[63] Continuation of Ser. No. 299,441, Jan. 23, 1989, abandoned.

[30] Foreign Application Priority Data

Jan. 25, 1988 [JP] Japan ................. 63-012574

[51] Int. Cl.⁵ .............. C09K 19/34; C09K 19/52; C09K 19/32; C09K 19/30
[52] U.S. Cl. .............. 252/299.61; 252/299.01; 252/299.62; 252/299.63; 252/299.66; 252/299.67; 359/103; 359/104
[58] Field of Search .......... 252/299.01, 299.61, 252/299.62, 299.63, 299.66, 299.67; 359/103, 104

[56] References Cited

U.S. PATENT DOCUMENTS

| | | | |
|---|---|---|---|
| 4,357,078 | 11/1982 | Carr et al. | 252/299.63 |
| 4,510,069 | 4/1985 | Eidenschink et al. | 252/299.61 |
| 4,818,428 | 4/1989 | Scheuble et al. | 252/299.63 |
| 4,846,998 | 7/1989 | Pohl et al. | 252/299.63 |
| 4,867,903 | 9/1989 | Nohira et al. | 252/299.61 |
| 4,873,018 | 10/1989 | Nohira et al. | 252/299.61 |
| 4,886,619 | 12/1989 | Janulis et al. | 252/299.61 |
| 4,886,620 | 12/1989 | Hopf et al. | 252/299.61 |
| 4,904,410 | 2/1990 | Nohira et al. | 252/299.61 |
| 4,911,863 | 3/1990 | Sage et al. | 252/299.63 |
| 4,917,821 | 4/1990 | Mori et al. | 252/299.63 |
| 4,918,213 | 4/1990 | Nohira et al. | 252/299.63 X |
| 4,921,632 | 5/1990 | Nakamura et al. | 252/299.63 |
| 4,925,278 | 5/1990 | Buchecker et al. | 350/350 S |
| 4,931,209 | 6/1990 | Ferrato et al. | 252/299.63 |
| 4,943,384 | 7/1990 | Sucrow et al. | 252/299.61 |

FOREIGN PATENT DOCUMENTS

| | | | |
|---|---|---|---|
| 0194659 | 9/1986 | European Pat. Off. | |
| 293910 | 12/1988 | European Pat. Off. | 252/299.63 |
| 326086 | 8/1989 | European Pat. Off. | 252/299.63 |
| 347940 | 12/1989 | European Pat. Off. | 252/299.63 |
| 347944 | 12/1989 | European Pat. Off. | 252/299.61 |
| 350396 | 1/1990 | European Pat. Off. | 252/299.63 |
| 350839 | 1/1990 | European Pat. Off. | 252/299.63 |
| 355313 | 2/1990 | European Pat. Off. | 252/299.61 |
| 364923 | 4/1990 | European Pat. Off. | 252/299.63 |
| 3518734 | 11/1986 | Fed. Rep. of Germany | 252/299.63 |
| 61-229870 | 10/1986 | Japan | 252/299.63 |
| 2-051583 | 2/1990 | Japan | 252/299.63 |
| 2-051586 | 2/1990 | Japan | 252/299.63 |

OTHER PUBLICATIONS

Helv. Chim. Acta 68(3) 813, 1985.

Primary Examiner—Robert L. Stoll
Assistant Examiner—Shean C. Wu
Attorney, Agent, or Firm—Fitzpatrick, Cella, Harper & Scinto

[57] ABSTRACT

A liquid crystal composition comprises at least one compound represented by the formula [I] below and at least one compound represented by the formula [II] below:

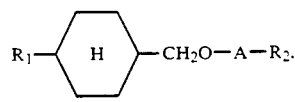

[I]

wherein $R_1$ denotes an alkyl group having 1-16 carbon atoms capable of having a substituent; $R_2$ denotes any one of alkyl group, alkoxy group, alkoxycarbonyl group, acyloxy group and alkoxycarbonyloxy group, each having 1-16 carbon atoms and being capable of having a substituent; and A denotes any one of (Abstract continued on next page.)

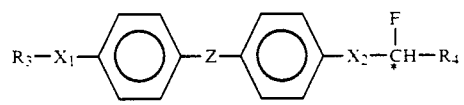
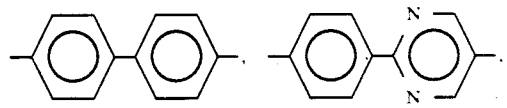 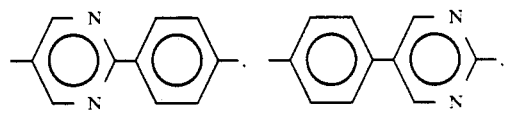
wherein $R_3$ denotes a linear alkyl group having 1-16 carbon atoms; $R_4$ denotes a linear alkyl group having 1-12 carbon atoms; $X_1$ is a single bond, —O—,
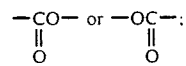
$X_2$ is —OCH$_2$—,
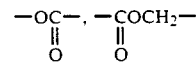
or —CH$_2$—; and Z is
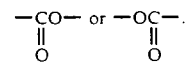
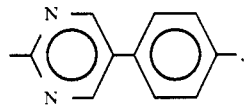
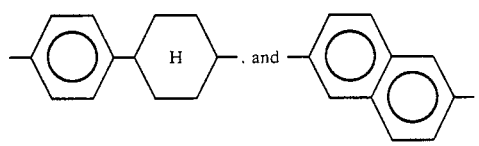
each capable of having a substituent; and
3 Claims, 1 Drawing Sheet

LIQUID CRYSTAL COMPOSITION AND LIQUID CRYSTAL DEVICE USING SAME

This application is a continuation of application Ser. No. 299,441 filed Jan. 23, 1989, now abandoned.

FIELD OF THE INVENTION AND RELATED ART

The present invention relates to a liquid crystal composition used in a liquid crystal display device, a liquid crystal-optical shutter, etc., and more particularly to a novel liquid crystal composition with improved responsiveness to an electric field.

Hitherto, liquid crystal devices have been used as an electro-optical device in various fields. Most liquid crystal devices which have been put into practice use TN (twisted nematic) type liquid crystals, as shown in "Voltage-Dependent Optical Activity of a Twisted Nematic Liquid Crystal" by M. Schadt and W. Helfrich "Applied Physics Letters" Vol. 18, No. 4 (Feb. 15, 1971) pp. 127-128.

These devices are based on the dielectric alignment effect of a liquid crystal and utilize an effect that the average molecular axis direction is directed to a specific direction in response to an applied electric field because of the dielectric anisotropy of liquid crystal molecules. It is said that the limit of response speed is on the order of milli-seconds, which is too slow for many uses. On the other hand, a simple matrix system of driving is most promising for application to a large-area flat display In view of cost, productivity, etc., in combination. In the simple matrix system, an electrode arrangement wherein scanning electrodes and signal electrodes are arranged in a matrix, and for driving, a multiplex driving scheme is adopted wherein an address signal is sequentially, periodically and selectively applied to the scanning electrodes and prescribed data signals are selectively applied in parallel to the signal electrodes in synchronism with the address signal.

When the above-mentioned TN-type liquid crystal is used in a device of such a driving system, a certain electric field is applied to regions where a scanning electrode is selected and signal electrodes are not selected or regions where scanning electrode is not selected and a signal electrode is selected (which regions are so called "half-selected points"). If the difference between a voltage applied to the selected points and a voltage applied to half-selected points is sufficiently large, and a voltage threshold level required for allowing liquid crystal molecules to be aligned or oriented perpendicular to an electric field is set to a value therebetween, display devices normally operate. However, in fact, as the number (N) of scanning lines increases, a time (duty ratio) during which an effective electric field is applied to one selected point when a whole image area (corresponding to one frame) is scanned decreases with a ratio of 1/N. Accordingly, the larger the number of scanning lines are, the smaller is the voltage difference of an effective value applied to a selected point and non-selected points when scanning is repeatedly effected. As a result, this leads to unavoidable drawbacks of lowering of image contrast or occurrence of interference or crosstalk. These phenomena are regarded as essentially unavoidable problems appearing when a liquid crystal having no bistability (i.e. liquid crystal molecules are horizontally oriented with respect to the electrode surface as stable state and is vertically oriented with respect to the electrode surface only when an electric field is effectively applied) is driven (i.e. repeatedly scanned) by making use of a time storage effect. To overcome these drawbacks, the voltage averaging method, the two-frequency driving method, the multiple matrix method, etc. has been already proposed. However, any method is not sufficient to overcome the above-mentioned drawbacks. As a result, it is the present state that the development of large image area or high packaging density in respect to display elements is delayed because it is difficult to sufficiently increase the number of scanning lines.

To overcome drawbacks with such prior art liquid crystal devices, the use of liquid crystal devices having bistability has been proposed by Clark and Lagerwal (e.g. Japanese Laid-Open Patent Appln. No. 56-107216, U.S. Pat. No. 4367924, etc.). In this instance, as the liquid crystals having bistability, ferroelectric liquid crystals having chiral smectic C-phase (SmC*) or H-phase (SmH*) are generally used. These liquid crystals have bistable states of first and second stable states with respect to an electric field applied thereto. Accordingly, as different from optical modulation devices in which the above-mentioned TN-type liquid crystals are used, the bistable liquid crystal molecules are oriented to first and second optically stable states with respect to one and the other electric field vectors, respectively. Further, this type of liquid crystal has a property (bistability) of assuming either one of the two stable states in response to an applied electric field and retaining the resultant state in the absence of an electric field.

In addition to the above-described characteristic of showing bistability, the ferroelectric liquid crystal has an excellent property, i.e., a high-speed responsiveness. This is because the spontaneous polarization of the ferroelectric liquid crystal and an applied electric field directly interact with each other to induce transition of orientation states. The resultant response speed is faster than the response speed due to the interaction between dielectric anisotropy and an electric field by 3 to 4 digits.

Thus, a ferroelectric liquid crystal potentially has very excellent characteristics, and by making use of these properties, it is possible to provide essential improvements to many of the above-mentioned problems with the conventional TN-type devices. Particularly, the application to a high-speed optical shutter and a display of a high density and a large picture is expected. For this reason, there has been made extensive research with respect to liquid crystal materials showing ferroelectricity. However, ferroelectric liquid crystal materials developed heretofore cannot be said to satisfy sufficient characteristics required for a liquid crystal device including low-temperature operation characteristic, high-speed responsiveness, etc.

Among a response time $\tau$ the magnitude of spontaneous polarization Ps and viscosity $\eta$, the following relationship exists: $\tau = \eta/(Ps \cdot E)$, where E is an applied voltage. Accordingly, a large response speed can be obtained by (a) increasing the spontaneous polarization, (b) lowering the viscosity $\eta$, or (c) increasing the applied voltage. However, the driving voltage has a certain upper limit in view of driving with IC, etc., and should desirably be as low as possible. Accordingly, it is actually necessary to lower the viscosity or increase the spontaneous polarization.

A ferroelectric chiral smectic liquid crystal having a large spontaneous polarization generally provides a large internal electric field in a cell given by the spontaneous polarization and is liable to pose may constraints on the device construction giving bistability. Further, an excessively large spontaneous polarization is liable to accompany an increase in viscosity, so that a remarkable increase in response speed may not be attained as a result.

Further, if it is assumed that the operation temperature of an actual display device is 5°-40° C., the response speed changes by a factor of about 20, so that it actually exceeds the range controllable by driving voltage and frequency.

As described hereinabove, commercialization of a ferroelectric liquid crystal device requires a ferroelectric chiral smectic liquid crystal composition having a low viscosity, a high-speed responsiveness and a small temperature-dependence of response speed.

SUMMARY OF THE INVENTION

An object of the present invention is to provide a liquid crystal composition, particularly a chiral smectic liquid crystal composition, having a high response speed and a smaller temperature-dependence of the response speed for providing a practical ferroelectric liquid crystal device and a liquid crystal device using the liquid crystal composition.

According to a generic aspect of the present invention, there is provided a liquid crystal composition, particularly a ferroelectric chiral smectic liquid crystal composition, comprising at least one compound represented by the formula [I] below and at least one compound represented by the formula [II] below:

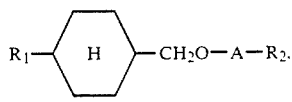
[I]

wherein $R_1$ denotes an alkyl group having 1-16 carbon atoms capable of having a substituent; $R_2$ denotes any one of alkyl group, alkoxy group, alkoxycarbonyl group, acyloxy group and alkoxycarbonyloxy group, each having 1-16 carbon atoms and being capable of having a substituent; and A denotes any one of

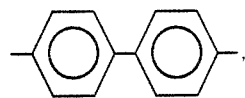

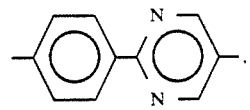

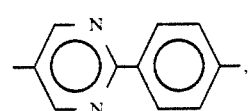

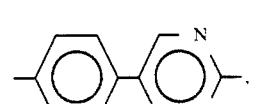

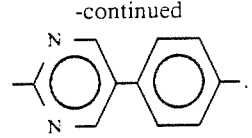

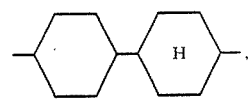

and

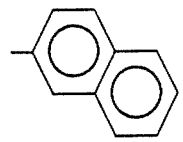

and each capable of having a substituent; and

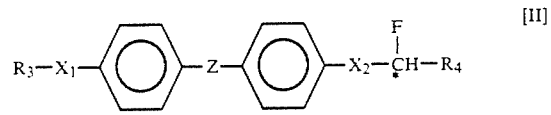
[II]

wherein $R_3$ denotes a linear alkyl group having 1-16 carbon atoms; $R_4$ denotes a linear alkyl group having 1-12 carbon atoms; $X_1$ is a single bond, —O—,

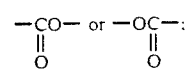

$X_2$ is —OCH$_2$—,

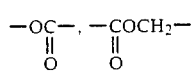

or —CH$_2$—; and Z is

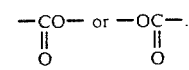

$R_1$ may preferably have 2-8 carbon atoms, and $R_2$ may preferably have 4-14 carbon atoms, further preferably 6-12 carbon atoms.

The present invention further provides a liquid crystal device using the above liquid crystal composition, more specifically a ferroelectric liquid crystal device comprising the above liquid crystal composition disposed between a pair of electrode plates.

The present invention is based on a discovery that the above-mentioned liquid crystal composition and liquid crystal device using the same provide improvements in various properties, such as high-speed responsiveness and decrease in temperature-dependence of response speed, thus providing good display characteristics.

DETAILED DESCRIPTION OF THE PREFERRED EMBODIMENTS

Figure 1:
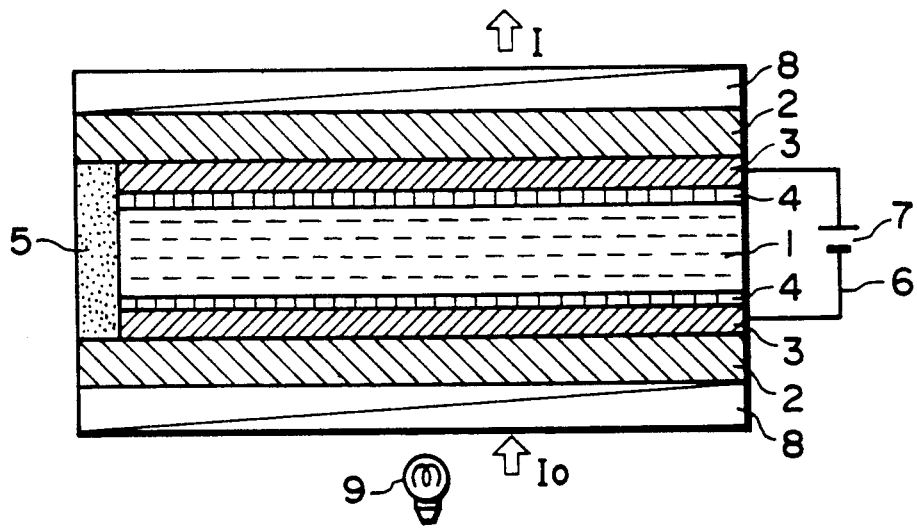
FIG. 1 is a schematic sectional view of a liquid crystal display device using a ferroelectric liquid crystal.

Examples of the mesomorphic compounds represented by the above general formula [I] may include those represented by the following structural formulas:

-continued
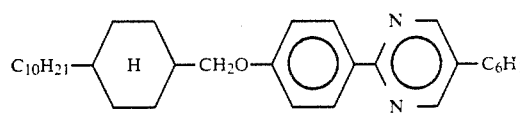 17
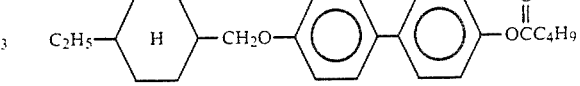 18
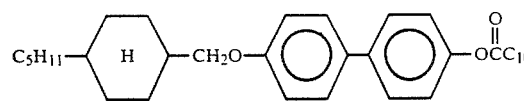 19
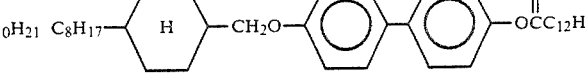 20
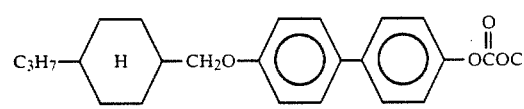 21
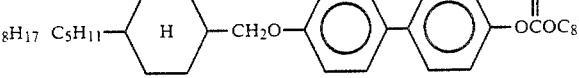 22
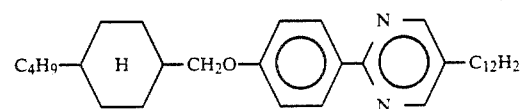 23
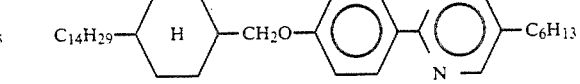 24
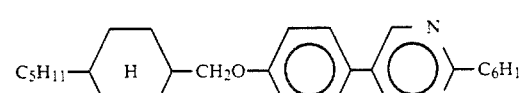 25
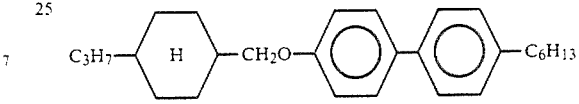 26
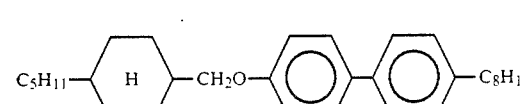 27
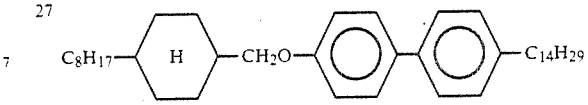 28
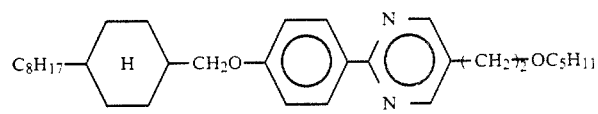 29
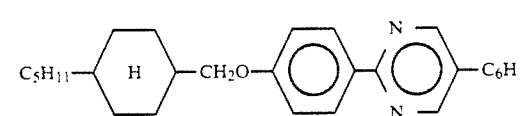 30
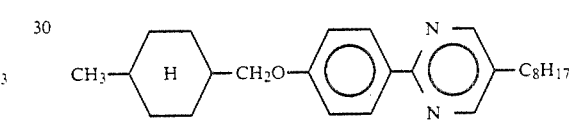 31
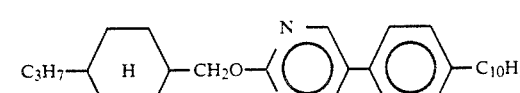 32
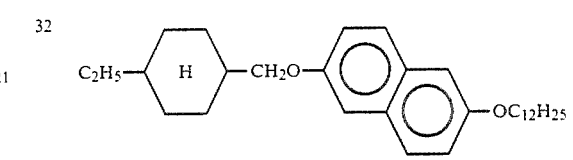 33
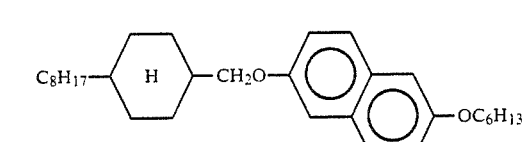 34
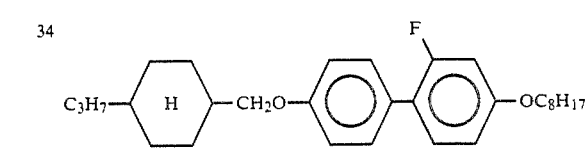 35
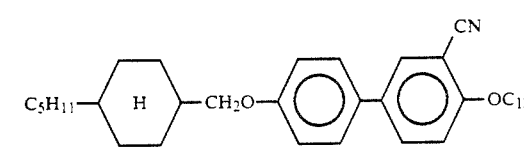 36
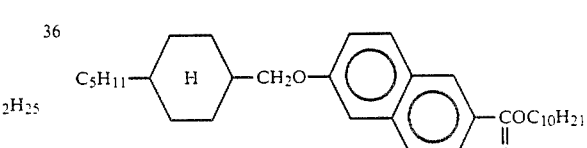 37

-continued

38. C4H9—[H]—CH2O—⟨phenyl⟩—naphthyl—COC6H13
    ‖
    O

39. C8H17—[H]—CH2O—⟨phenyl⟩—⟨pyrimidine⟩—OC14H29

40. C4H9—[H]—CH2O—⟨phenyl⟩—⟨pyrimidine⟩—OC11H23

41. C3H7—[H]—CH2O—⟨phenyl⟩—⟨pyrimidine⟩—COC10H21
    ‖
    O

42. C3H7—[H]—CH2O—⟨phenyl⟩—⟨pyrimidine⟩—C6H13

43. C4H9—[H]—CH2O—⟨phenyl⟩—⟨pyrimidine⟩—C10H21

44. C8H17—[H]—CH2O—⟨phenyl⟩—⟨pyrimidine⟩—C14H29

45. C3H7—[H]—CH2O—⟨phenyl⟩—⟨phenyl⟩—O(CH2)3CHOC3H7
                                              |
                                              CH3

46. C4H9—[H]—CH2O—⟨phenyl⟩—⟨phenyl⟩—OC10H21

47. C5H11—[H]—CH2O—⟨phenyl⟩—⟨pyrimidine⟩—C8H17

48. C5H11—[H]—CH2O—⟨phenyl⟩—⟨pyrimidine⟩—C4H9

49. C6H13—[H]—CH2O—⟨naphthyl⟩—OCCHCH2C2H5
                                 ‖  |
                                 O  CH3

50. C3H7—[H]—CH2O—⟨naphthyl⟩—OCCHC2H5
                                ‖ |
                                O Cl 51. C8H17—[H]—CH2O—⟨naphthyl⟩—OCOC6H13
                                ‖
                                O 52. C2H5—[H]—CH2O—⟨phenyl⟩—⟨pyrimidine⟩—C9H19

53. C4H9—[H]—CH2O—⟨phenyl⟩—⟨pyrimidine⟩—C8H17

54. C12H25—[H]—CH2O—⟨phenyl⟩—⟨pyrimidine⟩—C8H17

55. C12H25—[H]—CH2O—⟨phenyl⟩—⟨pyrimidine⟩—C14H29

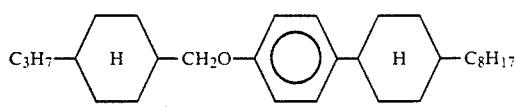 56

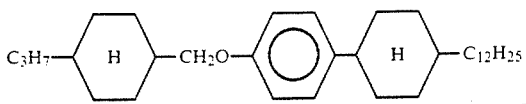 57

Some representative examples of synthesis of the mesomorphic compound represented by the above formula [I] are described.

SYNTHESIS EXAMPLE 1

Synthesis of the above-mentioned Example Compound No. 4, i.e., a case where A is

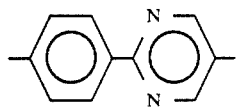

and $R_2$ is an alkyl (I) 10 g (53.6 mmol) of trans-4-n-propylcyclohexanecarboxylic acid chloride was dissolved in 30 ml of ethanol, and a small amount of triethylamine was added thereto, followed by 10 hours of stirring at room temperature. The reaction mixture was poured into 100 ml of iced water, acidified with addition of 6N-hydrochloric acid aqueous solution and then extracted with isopropyl ether. The organic layer was washed with water repeatedly until the washing liquid reached neutrality, and then dried with magnesium sulfate. After distilling off the solvent, the product was purified by silica gel column chromatography to obtain 9.9 g of trans-4-n-propylcyclohexanecarboxylic acid-ethyl-ester.

(II) 0.73 g (19.1 mmol) of aluminum lithium hydride was added to 30 ml of dry ether, and the mixture was heat-refluxed for 1 hour. The mixture was cooled to about 10° C. on an iced water bath, and a solution of 5 g (25.5 mmol) of trans-4-n-propylcyclohexanecarboxylic acid-ethyl-ester dissolved in 30 ml of dry ether was gradually added dropwise thereto. After the addition, the mixture was stirred for 1 hour at room temperature and further heat-refluxed for 1 hour. The reaction mixture was treated with ethyl acetate and 6N-hydrochloric acid aqueous solution and then poured into 200 ml of iced water.

After the extraction with isopropyl ether, the organic layer was successively washed with water, sodium hydroxide aqueous solution and water, followed by drying with magnesium sulfate. After distilling off the solvent, the product was purified by silica gel column chromatography to obtain 3.5 g of trans-4-n-propylcyclohexylmethanol.

(III) 3.4 g (22.4 mmol) of trans-4-n-propylcyclohexylmethanol was dissolved in 20 ml of pyridine, and 5.3 g of p-toluenesulfonyl chloride dissolved in 20 ml of pyridine was added thereto on an iced water bath for cooling below 5° C.. The mixture was stirred for 10 hours at room temperature and then poured in 200 ml of iced water. The mixture was acidified with 6N-hydrochloric acid aqueous solution and extracted with isopropyl ether. The organic layer was washed with water repeatedly until the washing liquid reached neutrality and then dried with magnesium sulfate. Then, the solvent was removed by distillation to obtain trans-4-n-propylcyclohexylmethyl-p-toluenesulfonate.

(IV) 6.3 g (20.2 mmol) of 5-decyl-2-(4'-hydroxyphenyl)pyrimidine was dissolved in 40 ml of dimethylformamide. 1.5 g of 85 %-potassium hydroxide was added thereto followed by stirring for 1 hour at 100° C. To the mixture was added 6.9 g of trans-4-n-propylcyclohexylmethyl-p-toluenesulfonate, followed by 4 hours of stirring at 100° C. After the reaction, the reaction mixture was poured into 200 ml of iced water and extracted with benzene. The organic layer was washed with water and dried with magnesium sulfate. After distilling off the solvent, the product was purified by silica gel column chromatography and recrystalized from a mixture solvent of ethanol/ethyl acetate to obtain the above-mentioned Example Compound No. 4.

IR (cm$^{-1}$): 2920, 2840, 1608, 1584, 1438, 1258, 1164, 800.

Phase transition temperature (°C.):

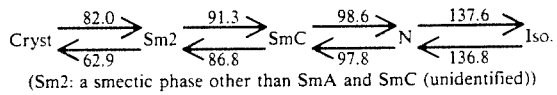

(Sm2: a smectic phase other than SmA and SmC (unidentified))

SYNTHESIS EXAMPLE 2

Synthesis of the above-mentioned Example Compound No. 12, i.e., a case where A is

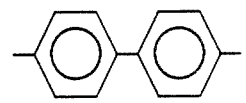

and $R_2$ is an alkoxycarbonyl group (I) 4.0 g (26.3 mmol) of trans-4-n-propylcyclohexylmethanol prepared in the same manner as in (I) and (II) of the above Synthesis Example 2 was dissolved in 25 ml of pyridine, and 6.0 g of p-toluenesulfonyl chloride dissolved in 25 ml of pyridine was added thereto on an iced water bath for cooling below 5° C. The mixture was stirred for 12 hours at room temperature and then poured in 200 ml of iced water. The mixture was acidified with 6N-hydrochloric acid aqueous solution and extracted with isopropyl ether. The organic layer was washed with water repeatedly until the washing liquid reached neutrality and then dried with magnesium sulfate. Then, the solvent was removed by distillation to obtain trans-4-n-propyl-cyclohexylmethyl-p-toluenesulfonate.

(II) 9.3 g (26.3 mmol) of 4-decyloxycarbonyl-4'-hydroxybiphenyl was dissolved in 70 ml of dimethylformamide, and 2.1 g of 85 %-potassium hydroxide was added thereto, followed by stirring for 1.5 hours at 100° C. To the mixture was added 7.4 g of trans-4-n-propylcycohexylmethyl-p-toluenesulfonate, followed by 5 hours of stirring at 100° C. After the reaction, the reaction mixture was poured into 200 ml of iced water and extracted with benzene. The organic layer was washed with water and dried with magnesium sulfate. After distilling off the solvent, the product was purified by silica gel column chromatography and recrystallized from a mixture solvent of ethanol/ethyl acetate to obtain the above-mentioned Example Compound No. 12.

IR (cm$^{-1}$): 2920, 2840, 1710, 1604, 1288, 1198, 1110 830, 772.

Phase transition temperature (°C):

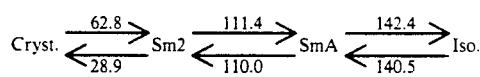

Hereinabove, some examples of synthesis of representative mesomorphic compounds have been explained. The other compounds represented by the general formula [I] may also be prepared by tosylating or halogenating a corresponding para-substituted cyclohexylmethanol and then reacting the product with a corresponding phenol. Principal reaction paths therefor may be represented by the following scheme:

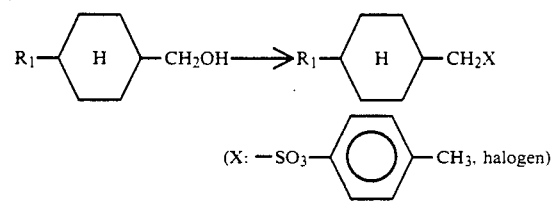

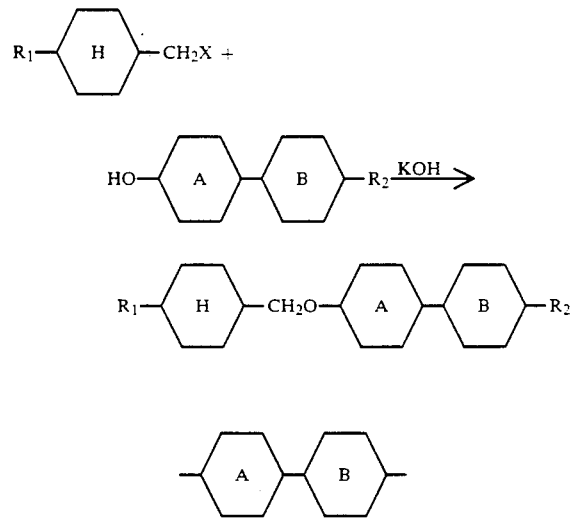

corresponds to A and $R_1$ and $R_2$ have the same meanings as defined above.

The liquid crystal composition of the present invention may be obtained by mixing at least one mesomorphic compound represented by the above formula [I] with at least one other ferroelectric mesomorphic compound or another ferroelectric liquid crystalcomposition in appropriate proportions. The liquid crystal composition of the present invention may preferably be used as a ferroelectric liquid crystal composition, particularly in the form of a ferroelectric chiral smectic liquid crystal composition.

More specifically, at least one mesomorphic compound of the above formula [I] may be mixed with at least one mesomorphic compound of the formula [II] shown below to provide a liquid crystal composition having a small temperature-dependence of response speed:

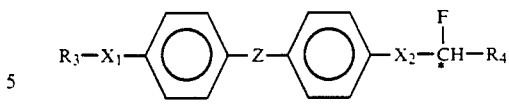

wherein $R_3$ denotes a linear alkyl group having 1-16 carbon atoms, preferably 4-12 carbon atoms; $R_4$ denotes a linear alkyl group having 1-12 carbon atoms, preferably 2-8 carbon atoms; $X_1$ is a single bond, —O—,

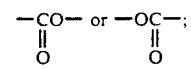

$X_2$ is —OCH$_2$—,

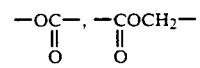

or —CH$_2$—; and Z is

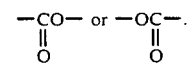

Further, at least one mesomorphic compound of the above formula [I] may be mixed with a mesomorphic compound of the formula [II] and further with at least one compound represented by any of the following formulas [III], [IV] and [V] to provide a liquid crystal composition having an improved low-temperature operation characteristic while retaining a decreased temperature dependence of response speed:

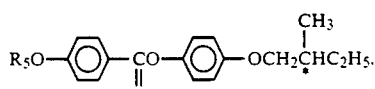

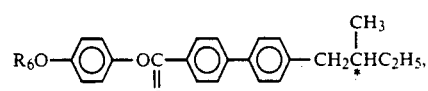

and

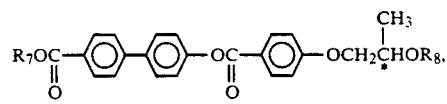

wherein $R_5$ and $R_6$ respectively denote a linear alkyl group having 1-14 carbon atoms, preferably 4-12 carbon atoms; $R_7$ denotes a linear alkyl group having 1-14 carbon atoms, preferably 6-10 carbon atoms; and $R_8$ denotes a linear alkyl group having 1-14 carbon atoms, preferably 2-8 carbon atoms.

Specific examples of the mesomorphic compounds represented by the general formulas [II], [III], [IV] and [V] may include those respectively represented by the structural formulas enumerated below:

Example compounds represented by the formula [II].

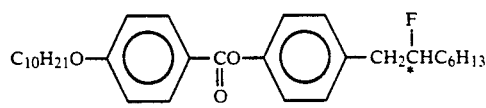

-continued
Example compounds represented by the formula [II].

(2-2) 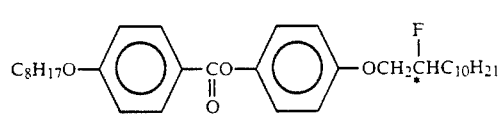

(2-3) 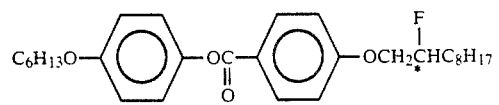

(2-4) 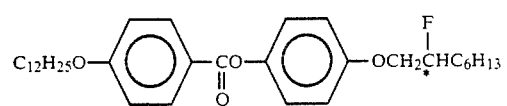

(2-5) 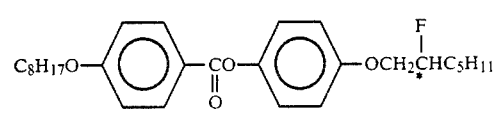

(2-6) 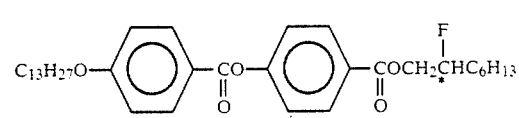

(2-7) 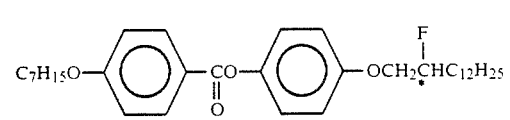

(2-8) 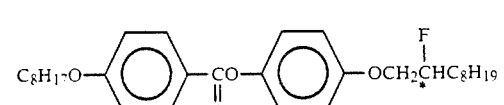

(2-9) 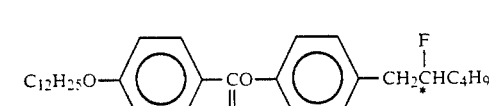

(2-10) 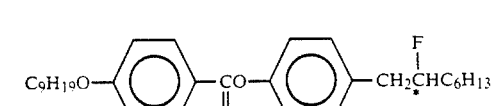

(2-11) 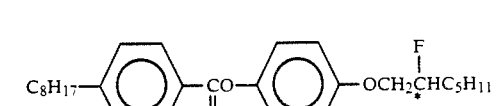

(2-12) 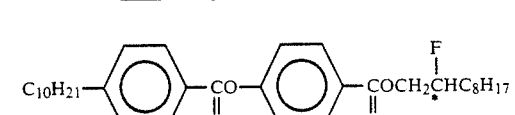

(2-13) 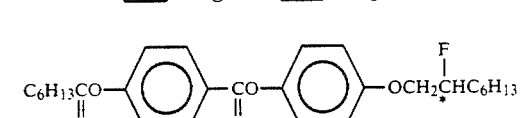

(2-14) 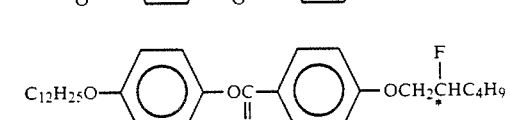

-continued
Example compounds represented by the formula [II].

(2-15) 

(2-16) 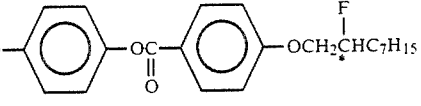

(2-17) 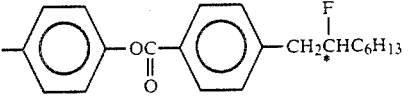

(2-18) 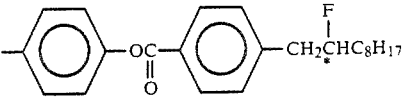

(2-19) 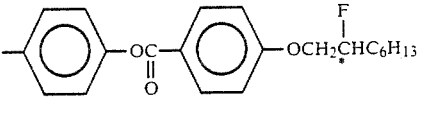

(2-20) 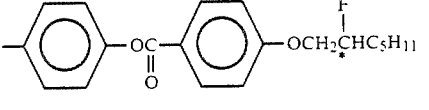

(2-21) 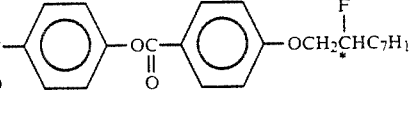

(2-22) 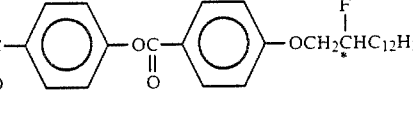

(2-23) 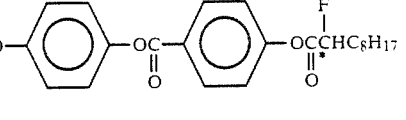

(2-24) 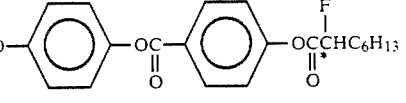

These mesomorphic compounds represented by the general formula [II] may be synthesized by the methods disclosed in, e.g., Japanese Laid-Open Patent Applications No. 22042/1988 and 122651 and Japanese Patent Application No. 227306/1987.

Example compounds represented by the formula [III].

(3-1) 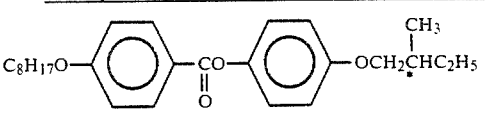

(3-2) 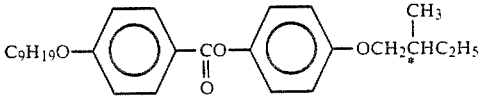

-continued
Example compounds represented by the formula [III].
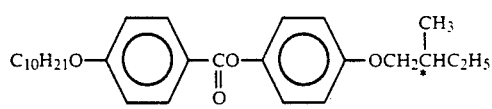 (3-3)
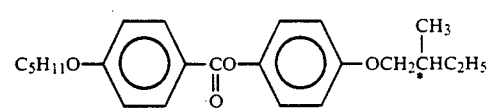 (3-4)
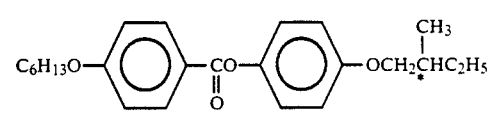 (3-5)
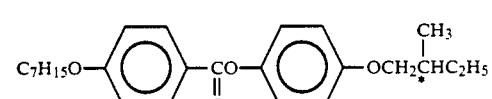 (3-6)
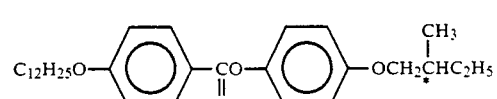 (3-7)
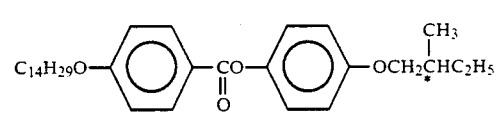 (3-8)
Example compounds represented by the formula [IV].
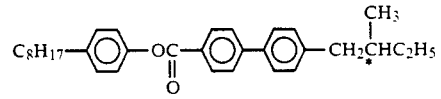 (4-1)
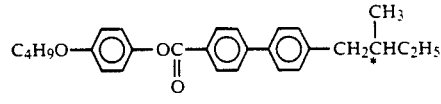 (4-2)
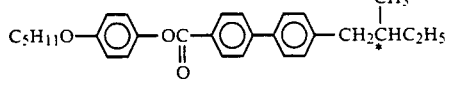 (4-3)
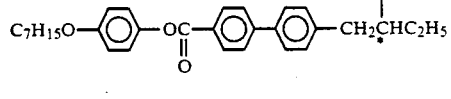 (4-4)
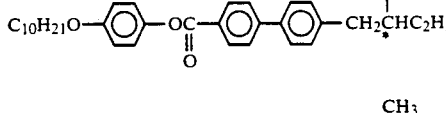 (4-5)
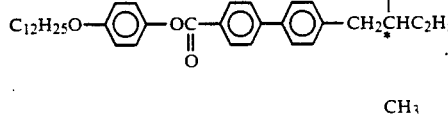 (4-6)
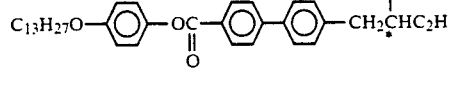 (4-7)
-continued
Example compounds represented by the formula [IV].
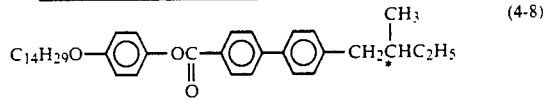 (4-8)
Example compounds represented by the formula [V].
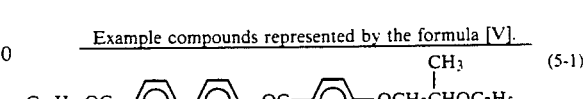 (5-1)
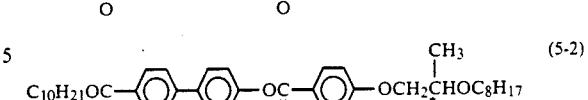 (5-2)
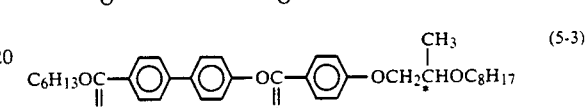 (5-3)
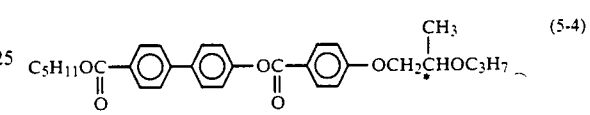 (5-4)
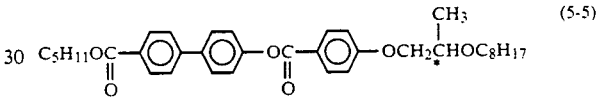 (5-5)
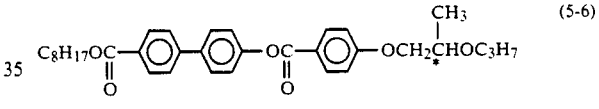 (5-6)
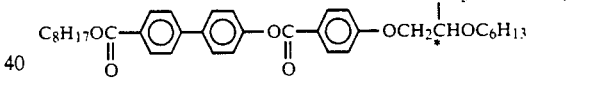 (5-7)
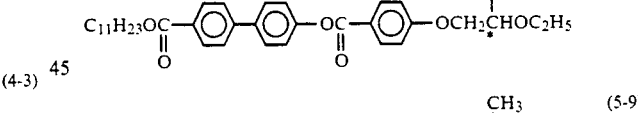 (5-8)
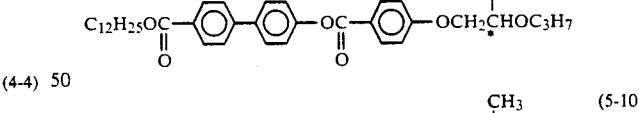 (5-9)
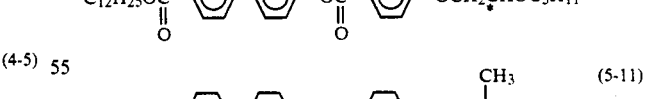 (5-10)
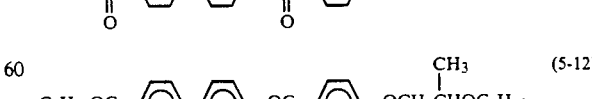 (5-11)
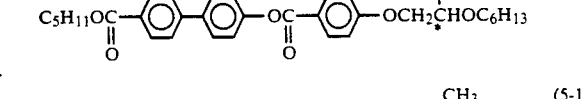 (5-12)
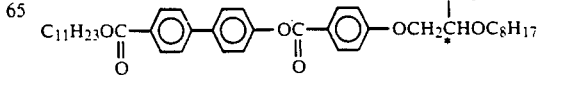 (5-13)

-continued
Example compounds represented by the formula [V].

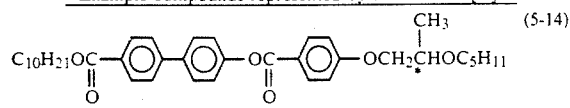  (5-14)

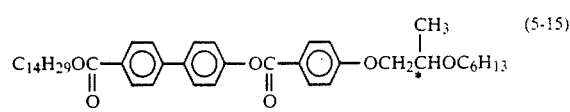  (5-15)

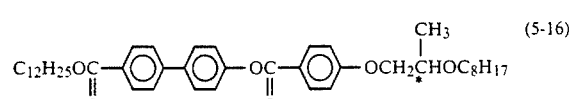  (5-16)

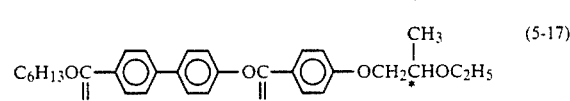  (5-17)

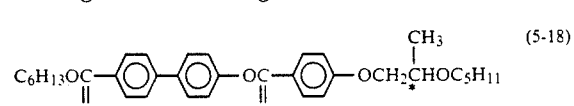  (5-18)

These compounds represented by the formula [V] may be synthesized, e.g., by the method disclosed in Japanese Laid-Open Patent Application No. 138454/1987.

According to further experiments of ours, at least one mesomorphic compound represented by the above formula [I] may be mixed with at least one of the following compounds to provide a liquid crystal composition having an improved low-temperature operation characteristic:

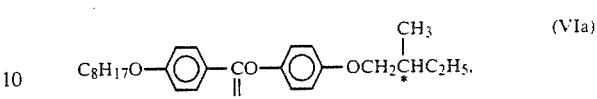  (VIa)

and

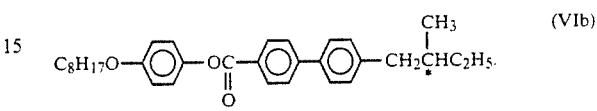  (VIb)

It is further possible to provide a liquid crystal composition having an improved low-temperature operation characteristic by mixing at least one mesomorphic compound of the formula [I] with at least one mesomorphic compound, particularly at least three mesomorphic compounds having different numbers of carbon atoms, represented by the formula [V].

The liquid crystal composition of the present invention can further contain another mesomorphic compound, examples of which may include those of the following structural formulas:

Compound No.

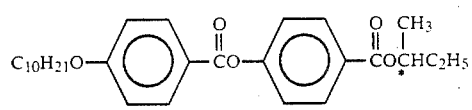  (1)

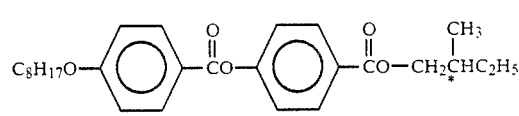  (2)

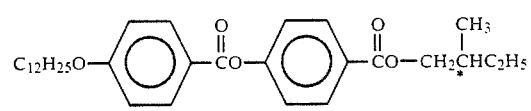  (3)

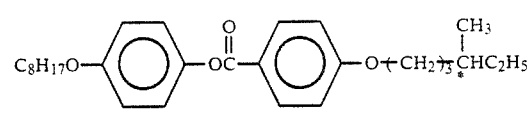  (4)

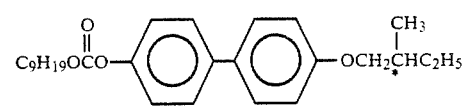  (5)

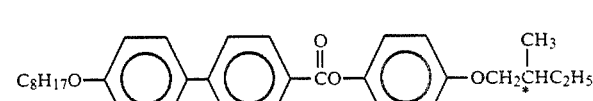  (6)

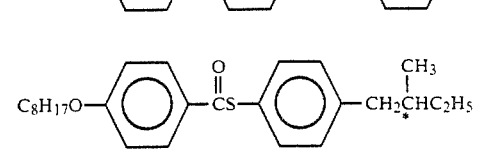  (7)

-continued
| | Compound No. |
|---|---|
| 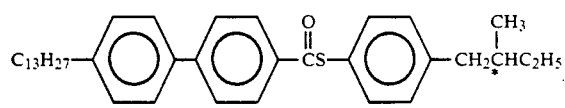 | (8) |
| 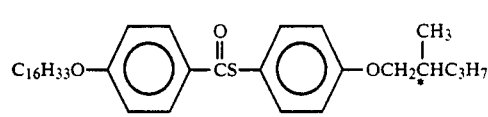 | (9) |
| 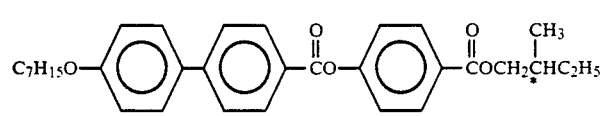 | (10) |
| 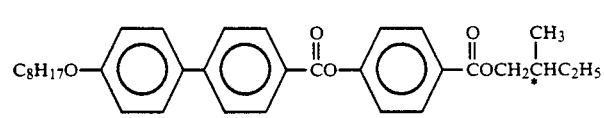 | (11) |
| 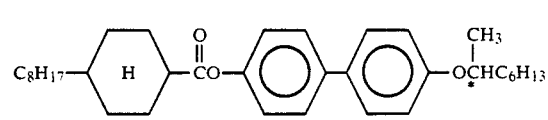 | (12) |
| 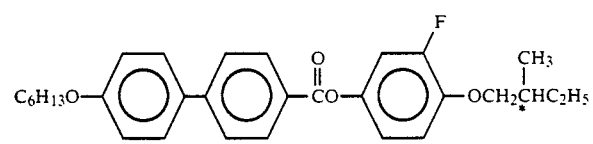 | (13) |
| 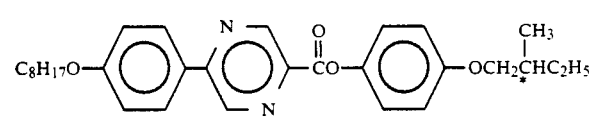 | (14) |
| 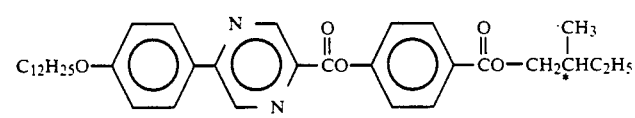 | (15) |
| 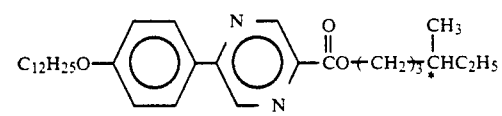 | (16) |
| 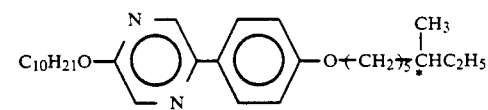 | (17) |
| 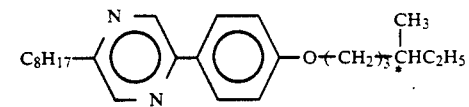 | (18) |
| 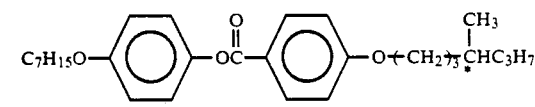 | (19) |
| 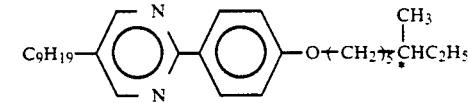 | (20) |

-continued
| | Compound No. |
|---|---|
| 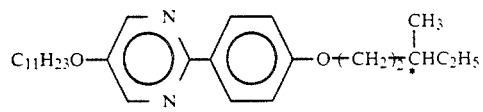 | (21) |
| 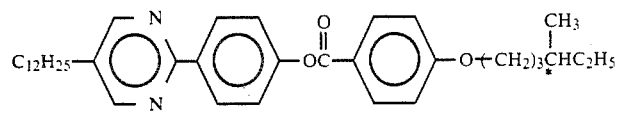 | (22) |
| 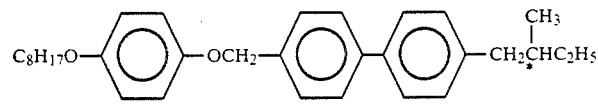 | (23) |
| 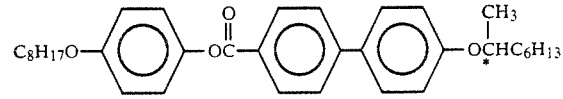 | (24) |
|  | (25) |
|  | (26) |
| 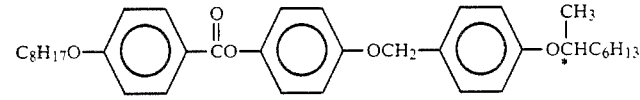 | (27) |
|  | (28) |
| 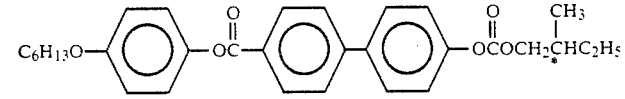 | (29) |
| 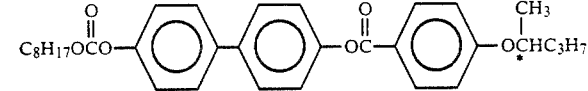 | (30) |
| 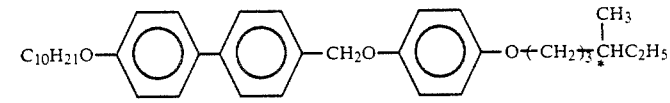 | (31) |
| 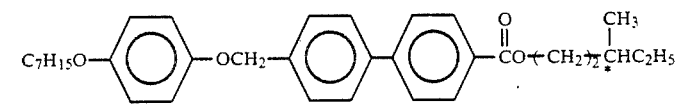 | (32) |
| 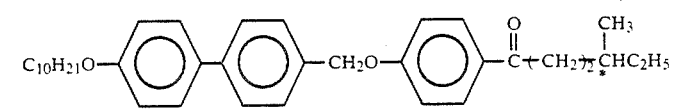 | (33) |

-continued
| | Compound No. |
|---|---|
| 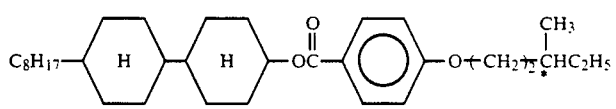 | (34) |
| 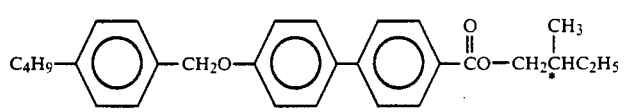 | (35) |
| 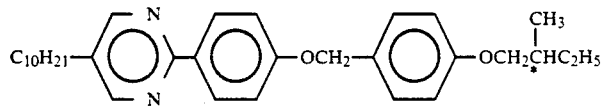 | (36) |
| 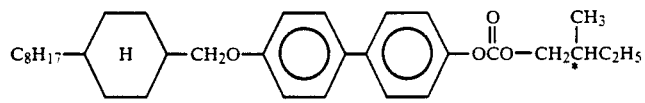 | (37) |
| 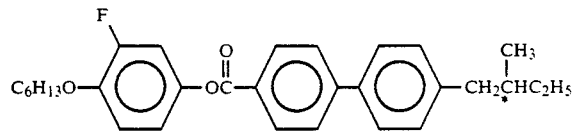 | (38) |
| 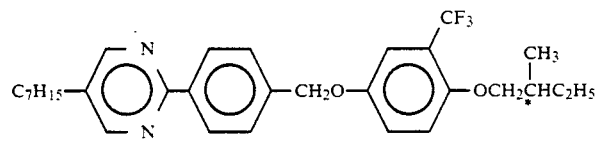 | (39) |
| 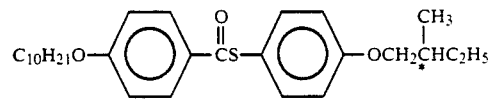 | (40) |
| 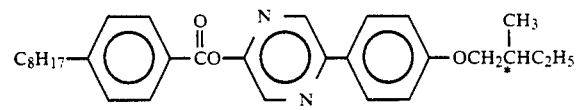 | (41) |
| 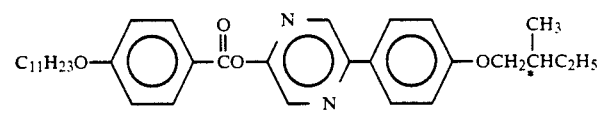 | (42) |
| 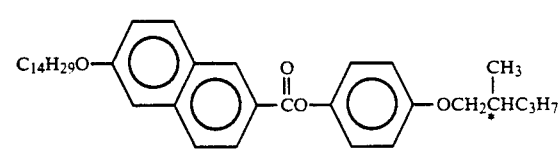 | (43) |
| 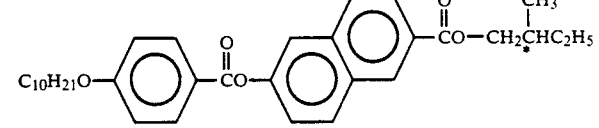 | (44) |
| 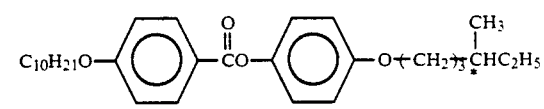 | (45) |

-continued
| | Compound No. |
|---|---|
| 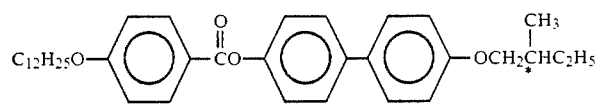 | (46) |
| 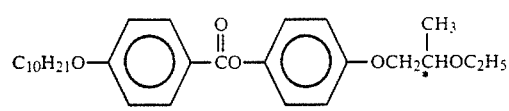 | (47) |
| 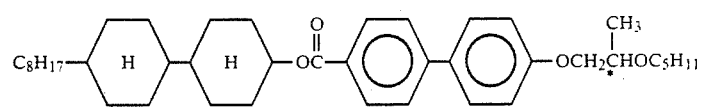 | (48) |
| 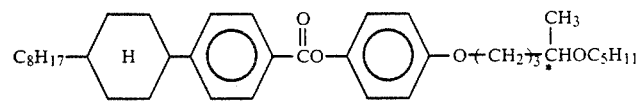 | (49) |
| 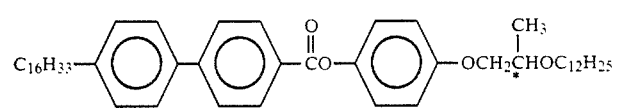 | (50) |
| 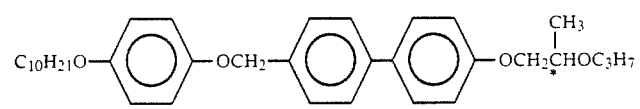 | (51) |
| 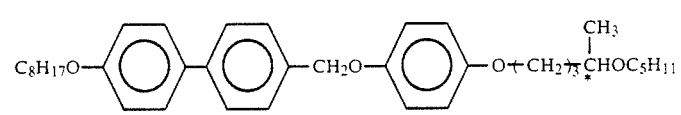 | (52) |
| 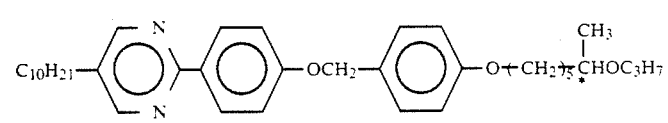 | (53) |
| 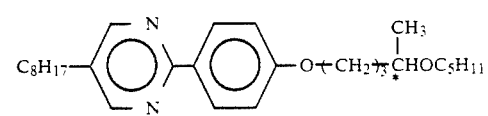 | (54) |
| 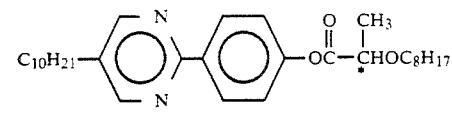 | (55) |
| 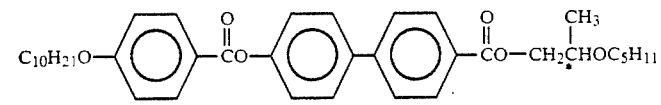 | (56) |
| 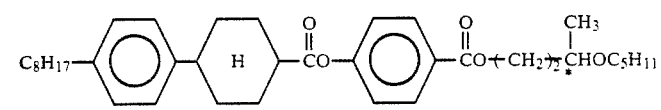 | (57) |
| 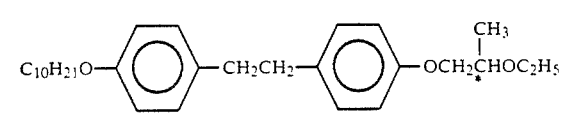 | (58) |

Compound No.
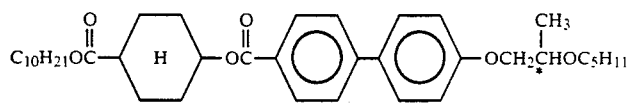
(59)
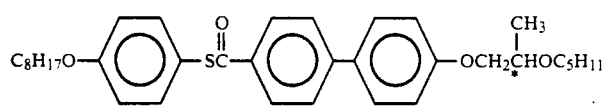
(60)
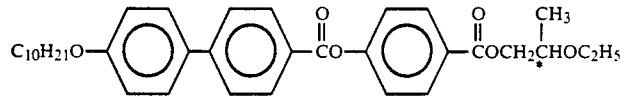
(61)
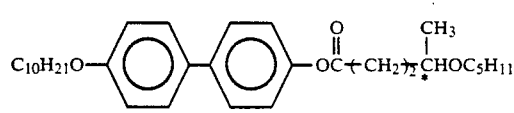
(62)
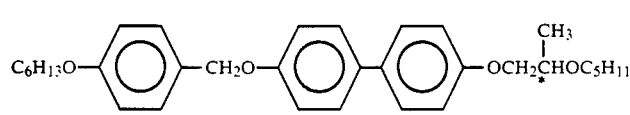
(63)
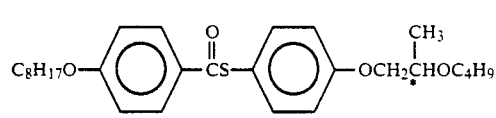
(64)
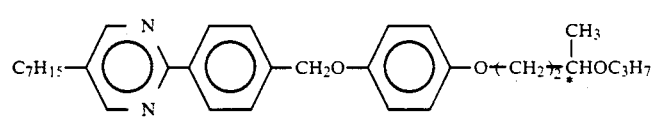
(65)
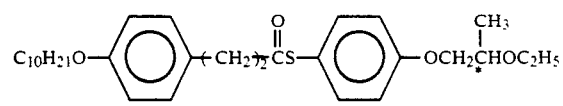
(66)
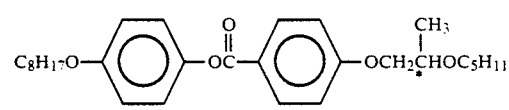
(67)
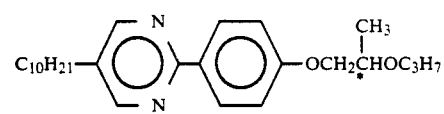
(68)
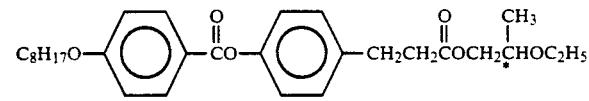
(69)
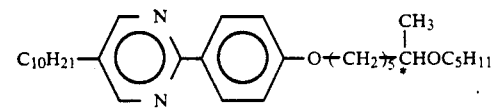
(70)
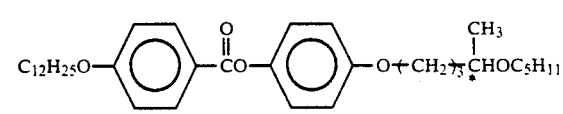
(71)

-continued
| | Compound No. |
|---|---|
| 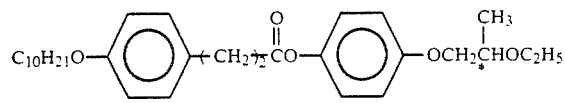 | (72) |
| 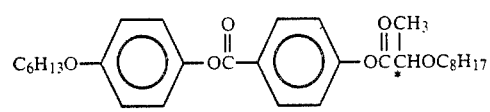 | (73) |
| 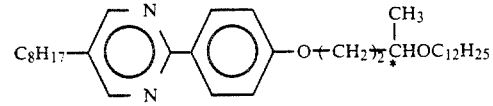 | (74) |
| 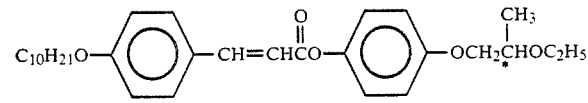 | (75) |
| 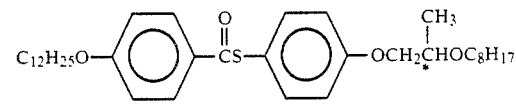 | (76) |
| 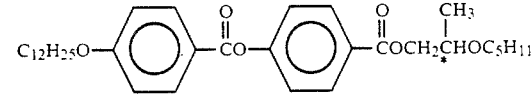 | (77) |
| 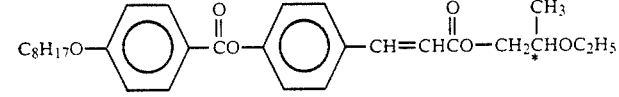 | (78) |
| 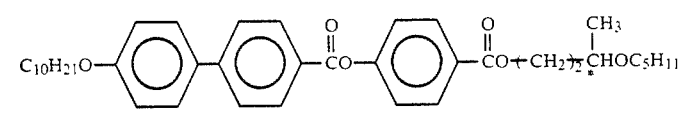 | (79) |
| 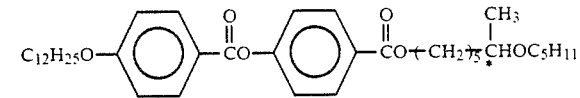 | (80) |
| 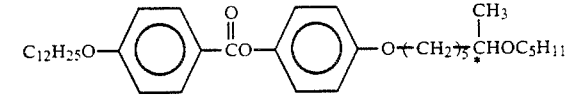 | (81) |
| 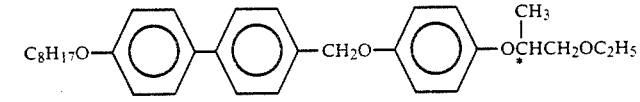 | (82) |
| 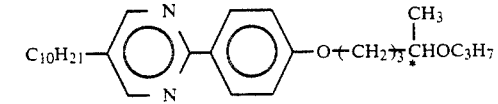 | (83) |
| 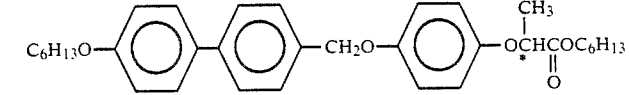 | (84) |

-continued
| | Compound No. |
|---|---|
| 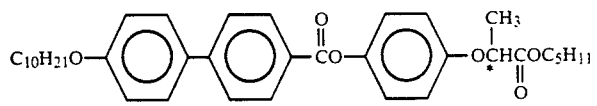 | (85) |
| 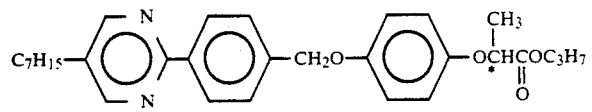 | (86) |
| 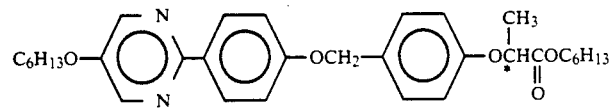 | (87) |
| 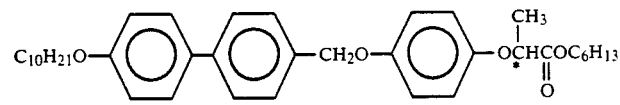 | (88) |
| 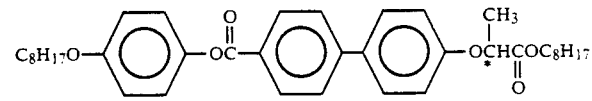 | (89) |
| 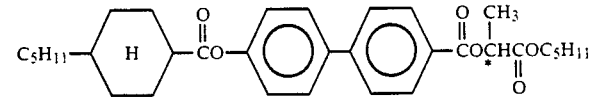 | (90) |
| 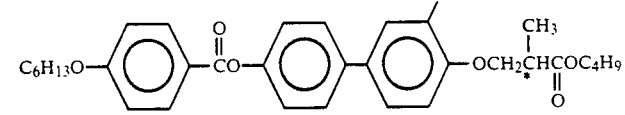 | (91) |
| 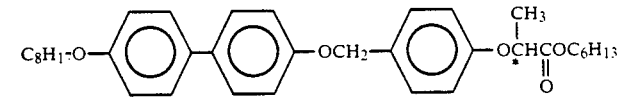 | (92) |
| 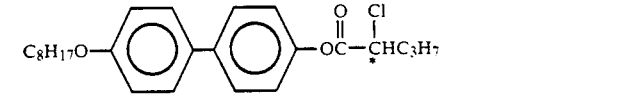 | (93) |
| 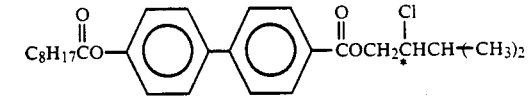 | (94) |
| 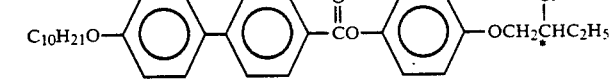 | (95) |
| 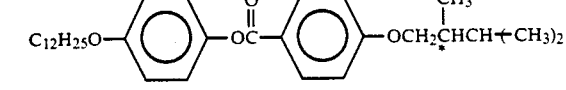 | (96) |
| 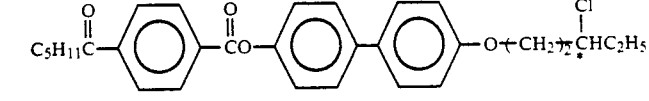 | (97) |

-continued
| | Compound No. |
|---|---|
| 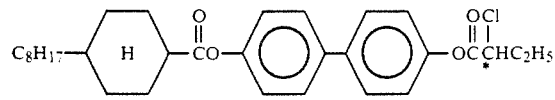 | (98) |
| 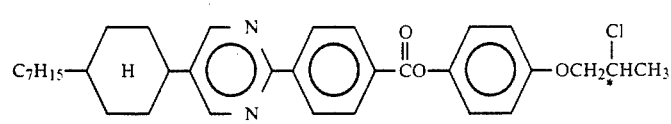 | (99) |
| 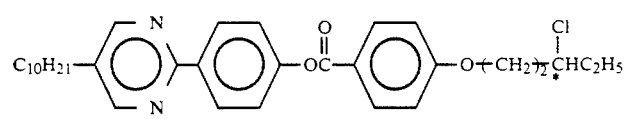 | (100) |
| 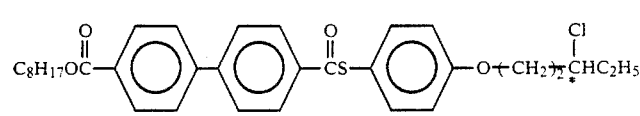 | (101) |
| 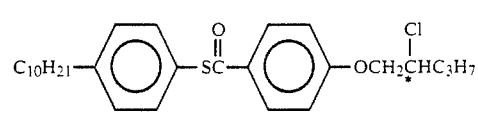 | (102) |
| 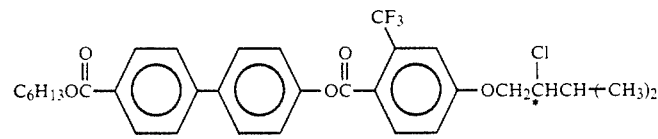 | (103) |
| 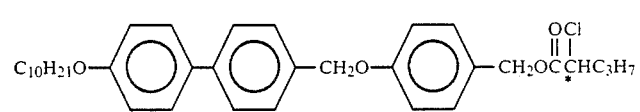 | (104) |
| 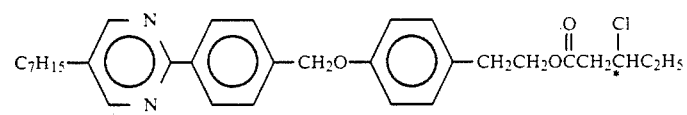 | (105) |
| 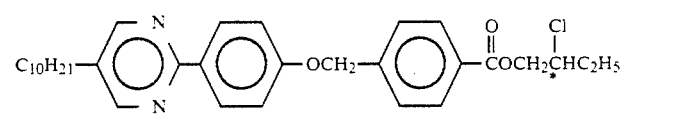 | (106) |
| 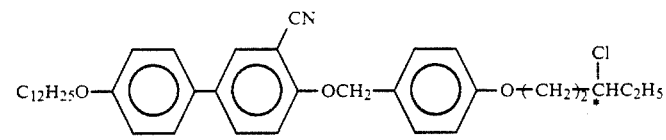 | (107) |
| 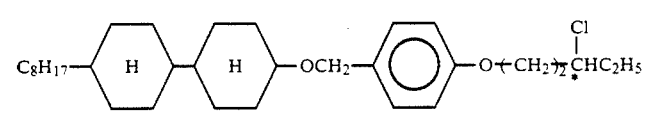 | (108) |
| 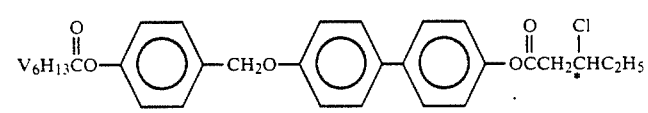 | (109) |
| 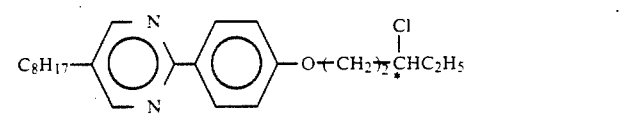 | (110) |

-continued
| | Compound No. |
|---|---|
| 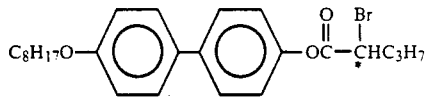 | (111) |
| 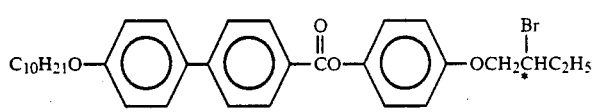 | (112) |
| 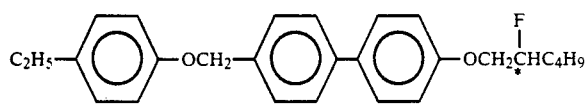 | (113) |
| 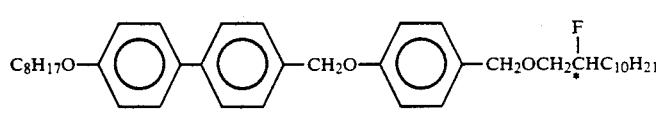 | (114) |
| 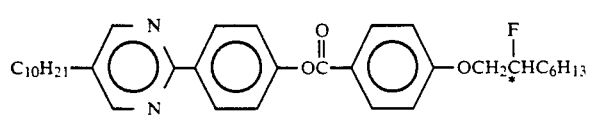 | (115) |
| 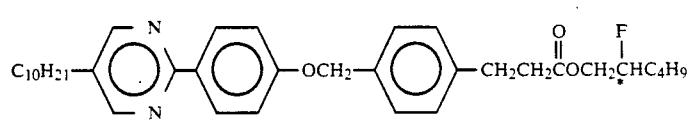 | (116) |
| 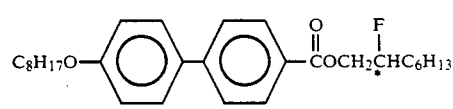 | (117) |
| 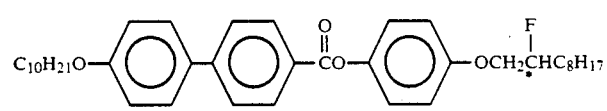 | (118) |
| 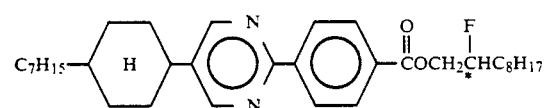 | (119) |
| 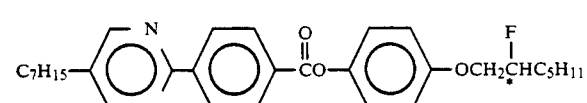 | (120) |
| 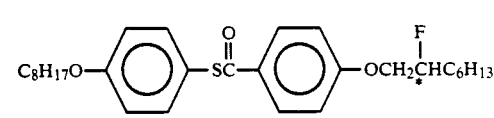 | (121) |
| 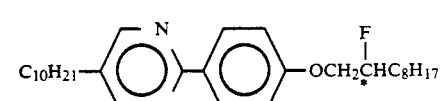 | (122) |
| 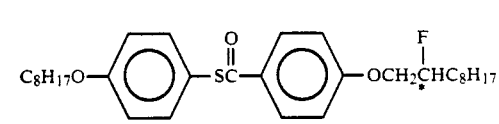 | (123) |

-continued
| | Compound No. |
|---|---|
| 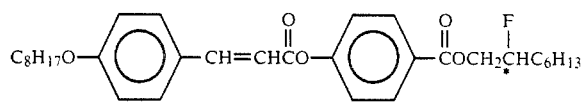 | (124) |
| 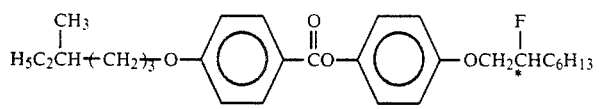 | (125) |
| 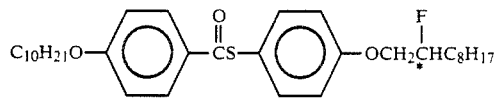 | (126) |
| 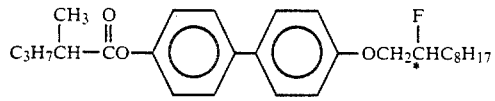 | (127) |
| 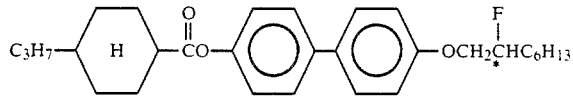 | (128) |
| 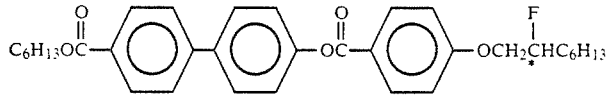 | (129) |
| 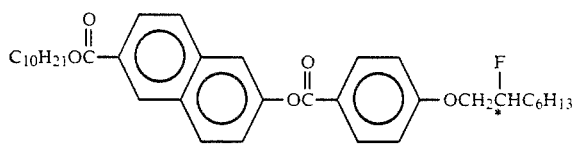 | (130) |
| 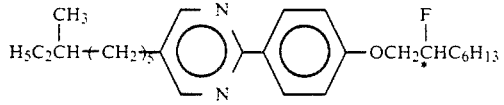 | (131) |
| 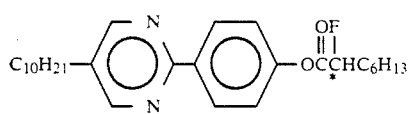 | (132) |
| 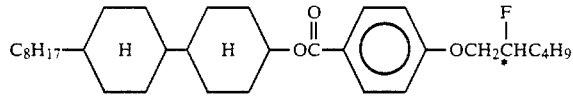 | (133) |
|  | (134) |
| 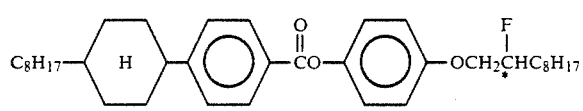 | (135) |
| 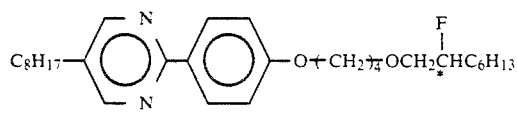 | (136) |

-continued
| | Compound No. |
|---|---|
| 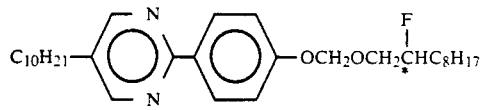 | (137) |
| 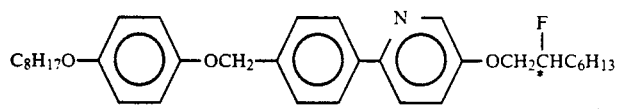 | (138) |
| 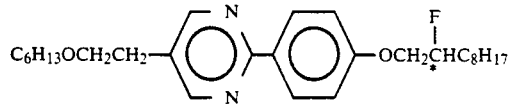 | (139) |
| 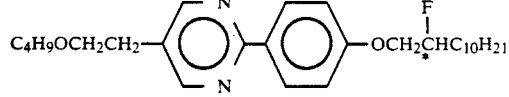 | (140) |
| 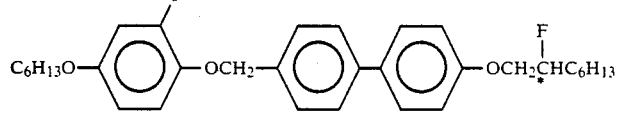 | (141) |
| 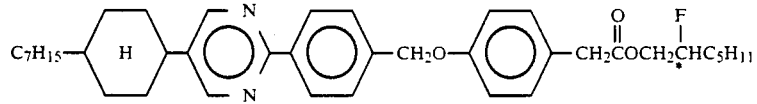 | (142) |
| 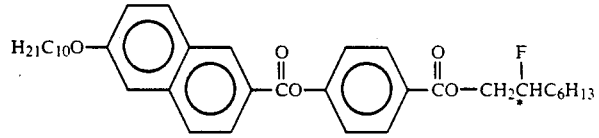 | (143) |
| 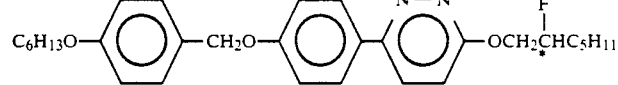 | (144) |
| 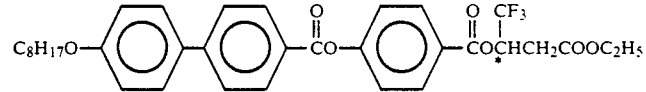 | (145) |
| 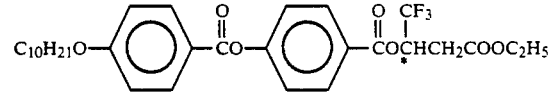 | (146) |
| 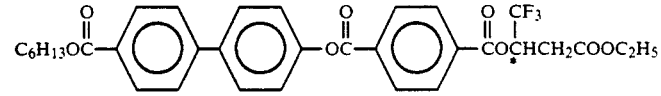 | (147) |
| 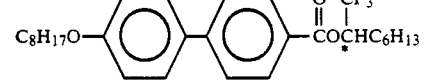 | (148) |
|  | (149) |

Compound No.
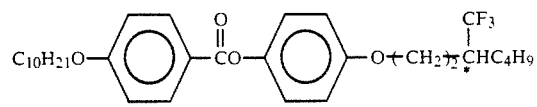
(150)
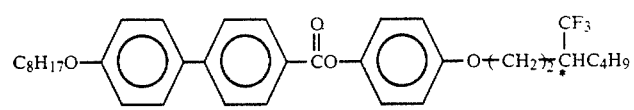
(151)
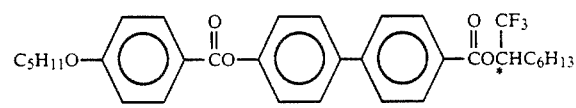
(152)
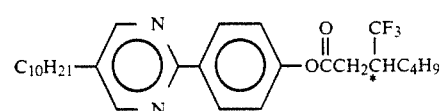
(153)
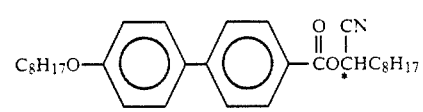
(154)
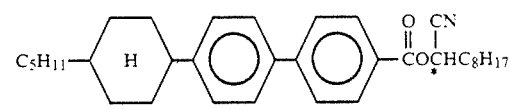
(155)
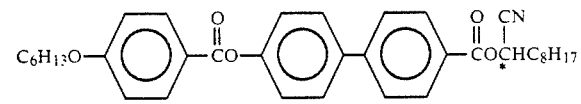
(156)
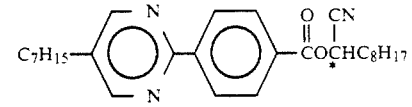
(157)
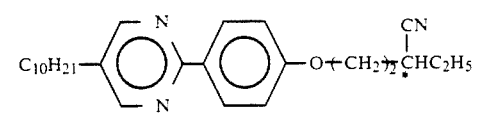
(158)
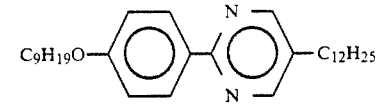
(159)
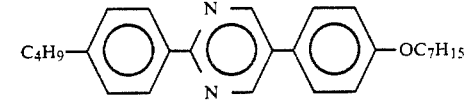
(160)
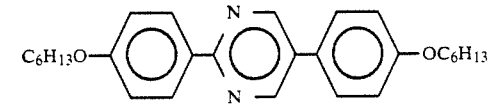
(161)
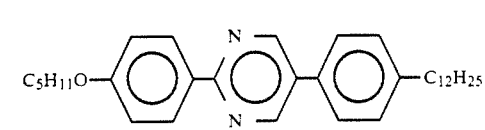
(162)

-continued

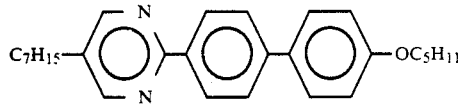
(163)

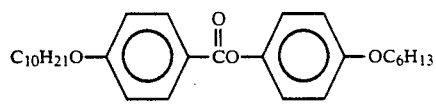
(164)

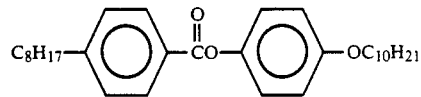
(165)

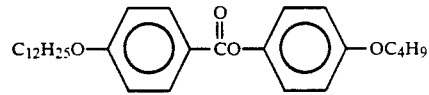
(166)

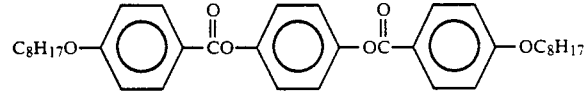
(167)

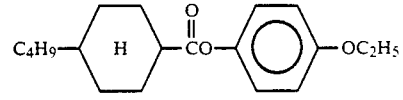
(168)

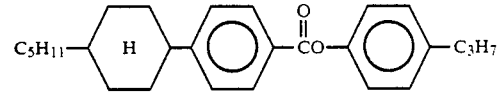
(169)

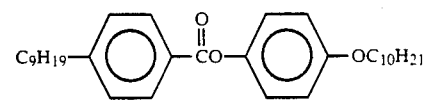
(170)

In the liquid crystal composition of the present invention, the mesomorphic compound represented by the formula [I] may preferably be contained in a proportion of 1-500 wt. parts, particularly 1-200 wt. parts, with respect to 100 wt. parts of the other ferroelectric liquid crystal material, i.e., the other ferroelectric liquid crystal compound(s) including those represented by the formulas [II]-[V] and (1)-(170).

In a three or more components system of the composition of the present invention, the combination of the compound of the formula [I] and the compound of the formula [II], (VIa) or (VIb) may preferably be contained in a proportion of 5-500 wt. parts, particularly 5-300 wt. parts, with respect to 100 wt. parts of the other ferroelectric liquid crystal material (except for those components specifically mentioned). Further, the combination of the compound of [I], the compound of the formula [II] and the compound of the formula [III], [IV] or [V], or the combination of the compound of the formula [I] are at least three compounds of the formula [V], may preferably be contained in a proportion of 5-800 wt. parts, particularly 10-400 wt. parts, with respect to 100 wt. parts of the other ferroelectric liquid crystal material (except for those components specifically mentioned).

The ferroelectric liquid crystal device according to the present invention may preferably be prepared by heating the liquid crystal composition prepared as described above into an isotropic liquid under vacuum, filling a blank cell comprising a pair of electrode plates with the composition, gradually cooling the cell to form a liquid crystal layer and restoring the normal pressure.

FIG. 1 is a schematic sectional view of an embodiment of the ferroelectric liquid crystal device prepared as described above for explanation of the structure thereof.

Referring to FIG. 1, the ferroelectric liquid crystal device includes a ferroelectric liquid crystal layer 1 disposed between a pair of glass substrates 2 each having thereon a transparent electrode 3 and an insulating alignment control layer 4. Lead wires 6 are connected to the electrodes so as to apply a driving voltage to the liquid crystal layer 1 from a power supply 7. Outside the substrates 2, a pair of polarizers 8 are disposed so as to modulate incident light $I_0$ from a light source 9 in cooperation with the liquid crystal 1 to provide modulated light I.

Each of two glass substrates 2 is coated with a transparent electrode 3 comprising a film of $In_2O_3$, $SnO_2$ or ITO (indium-tin-oxide) to form an electrode plate. Further thereon, an insulating alignment control layer 4 is formed by rubbing a film of a polymer such as polyimide with gauze or acetate fiber-planted cloth so as to align the liquid crystal molecules in the rubbing direction. Further, it is also possible to compose the alignment control layer of two layers, e.g., by first forming an insulating layer of an inorganic material, such as silicon nitride, silicon nitride containing hydrogen, silicon carbide, silicon carbide containing hydrogen, silicon oxide, boron nitride, boron nitride containing hydrogen, cerium oxide, aluminum oxide, zirconium oxide, titanium oxide, or magnesium fluoride, and forming thereon an alignment control layer of an organic insulating material, such as polyvinyl alcohol, polyimide, polyamide-imide, polyester-imide, polyparaxylylene, polyester, polycarbonate, polyvinyl acetal, polyvinyl chloride, polyvinyl acetate, polyamide, polystyrene, cellulose resin, melamine resin, urea resin, acrylic resin, or photoresist resin. Alternatively, it is also possible to use a single layer of inorganic insulating alignment control layer or organic insulating alignment control layer. An inorganic insulating alignment control layer may be formed by vapor deposition, while an organic insulating alignment control layer may be formed by applying a selection of an organic insulating material or a precursor thereof in a concentration of 0.1 to 20 wt. %, preferably 0.2-10 wt. %, by spinner coating, dip coating, screen printing, spray coating or roller coating, followed by curing or hardening under prescribed hardening condition (e.g., by heating). The inorganic insulating layer may have a thickness of ordinarily 50 Å-1 micron, preferably 100-5000 Å, further preferably 500-3000 Å. The two glass substrates 2 with transparent electrodes 3 (which may be inclusively referred to herein as "electrode plates") and further with insulating alignment control layers 4 thereof are held to have a prescribed (but arbitrary) gap with a spacer 5. For example, such a cell structure with a prescribed gap may be formed by sandwiching spacers of silica beads or alumina beads having a prescribed diameter with two glass plates, and then sealing the periphery thereof with, e.g., an epoxy adhesive. Alternatively, a polymer film or glass fiber may also be used as a spacer. Between the two glass plates, a ferroelectric liquid crystal is sealed up to provide a ferroelectric liquid crystal layer in a thickness of generally 0.5 to 20 microns, preferably 1 to 5 microns.

The transparent electrodes 3 are connected to the external power supply 7 through the lead wires 6. Further, outside the glass substrates 2, polarizers 8 are applied. The device shown in FIG. 1 is of a transmission type.

Figure 2:
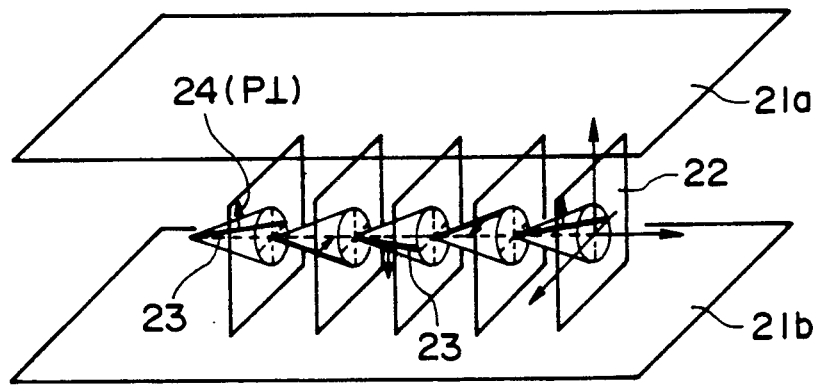
FIGS. 2 and 3 are respectively a schematic perspective view of a ferroelectric liquid crystal device for illustrating the operation of the device.

FIG. 2 is a schematic illustration of a ferroelectric liquid crystal cell (device) for explaining operation thereof. Reference numerals 21a and 21b denote substrates (glass plates) on which a transparent electrode of, e.g., $In_2O_3$, $SnO_2$, ITO (indium-tin-oxide), etc., is disposed, respectively. A liquid crystal of an SmC*-phase (chiral smectic C phase) in which liquid crystal molecular layers 22 are aligned perpendicular to surfaces of the glass plates is hermetically disposed therebetween. Full lines 23 show liquid crystal molecules. Each liquid crystal molecule 23 has a dipole moment (P⊥) 24 in a direction perpendicular to the axis thereof. The liquid crystal molecules 23 continuously form a helical structure in the direction of extension of the substrates. When a voltage higher than a certain threshold level is applied between electrodes formed on the substrates 21a and 21b, a helical structure of the liquid crystal molecule 23 is unwound or released to change the alignment direction of respective liquid crystal molecules 23 so that the dipole moments (P⊥) 24 are all directed in the direction of the electric field. The liquid crystal molecules 23 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device of which optical characteristics vary depending upon the polarity of an applied voltage.

Figure 3:
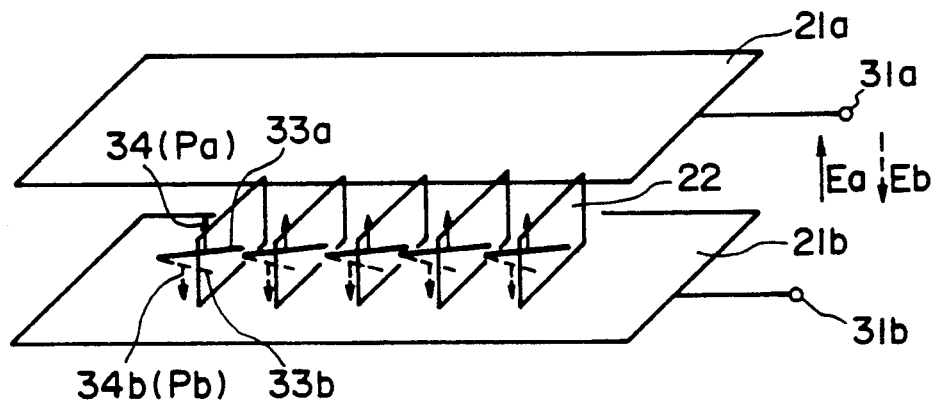

Further, when the liquid crystal cell is made sufficiently thin (e.g., about 1 micron), the helical structure of the liquid crystal molecules is unwound to provide a non-helical structure even in the absence of an electric field, whereby the dipole moment assumes either of the two states, i.e., Pa in an upper direction 34a or Pb in a lower direction 34b as shown in FIG. 3, thus providing a bistable condition. When an electric field Ea or Eb higher than a certain threshold level and different from each other in polarity as shown in FIG. 3 is applied to a cell having the above-mentioned characteristics, the dipole moment is directed either in the upper direction 34a or in the lower direction 34b depending on the vector of the electric field Ea or Eb. In correspondence with this, the liquid crystal molecules are oriented in either of a first stable state 33a and a second stable state 33b.

When the above-mentioned ferroelectric liquid crystal is used as an optical modulation element, it is possible to obtain two advantages. First is that the response speed is quite fast. Second is that the orientation of the liquid crystal shows bistability. The second advantage will be further explained, e.g., with reference to FIG. 3. When the electric field Ea is applied to the liquid crystal molecules, they are oriented in the first stable state 33a. This state is stably retained even if the electric field is removed. On the other hand, when the electric field Eb of which direction is opposite to that of the electric field Ea is applied thereto, the liquid crystal molecules are oriented to the second stable state 33b whereby the directions of molecules are changed. This state is similarly stably retained even if the electric field is removed. Further, as long as the magnitude of the electric field Ea or Eb being applied is not above a certain threshold value, the liquid crystal molecules are placed in the respective orientation states.

Hereinbelow, the present invention will be explained more specifically with reference to Examples.

EXAMPLE 1

A liquid crystal composition A was prepared by mixing the following compounds selected from those enumerated above in the respectively indicated amounts.

| Example Compound No. | Weight parts |
| --- | --- |
| (?-1) | 56 |
| (4-1) | 14 |
| (2-4) | 7.5 |
| (2-5) | 22.5 |

The liquid crystal composition A showed the following phase transition series (the numerals denote phase transition temperatures (°C.). The same as in the Examples appearing hereinafter).

The liquid crystal composition A was further mixed with Example Compounds Nos. 4 and 12 explained in the formerly described Synthesis Examples 1 and 2 in the proportions indicated below:

|  | weight parts |
| --- | --- |
| Liquid crystal composition A | 90 |
| Example compound No. 4 | 6.7 |
| Example compound No. 12 | 3.3 |

The resultant liquid crystal composition B showed the following phase transition series:

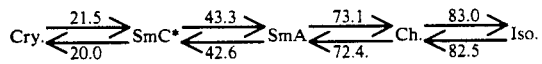

Then, two 0.7 mm-thick glass plates were provided and respectively coated with an ITO film to form an electrode for voltage application, which was further coated with an insulating layer of vapor-deposited $SiO_2$. On the insulating layer, a 0.2 %-solution of silane coupling agent (KBM-602, available from Shinetsu Kagaku K.K.) is isopropyl alcohol was applied by spinner coating at a speed of 2000 rpm for 15 second and subjected to hot curing treatment at 120° C. for 20 min.

Further, each glass plate provided with an ITo film and treated in the above described manner was coated with a 1.5 %-solution of polyimide resin precursor (SP-510, available from Toray K.K.) in dimethylacetoamide by a spinner coater rotating at 2000 rpm for 15 seconds. Thereafter, the coating film was subjected to heat curing at 300° C. for 60 min. to obtain about 250 Å-thick film. The coating film was rubbed with acetate fiber-planted cloth. The thus treated two glass plates were washed with isopropyl alcohol. After alumina beads with an average particle size of 2.0 microns were dispersed on one of the glass plates, the two glass plates were applied to each other with a bonding sealing agent (Lixon Bond, available from Chisso K.K.) so that their rubbed directions were parallel to each other and heated at 100° C. for 60 min. to form a blank cell. The cell gap was found to be about 2 microns as measured by a Berek compensator.

Then, the above-prepared liquid crystal composition B was heated into an isotropic liquid, and injected into the above prepared cell under vacuum and, after sealing, was gradually cooled at a rate of 5° C./hour to 25° C. to prepare a ferroelectric liquid crystal device.

The ferroelectric liquid crystal device was subjected to measurement of a spontaneous polarization Ps and an optical response time (time from voltage application until the transmittance change reaches 90 % of the maximum under the application of a peak-to-peak voltage Vpp of 20 V in combination with right-angle crossnicol polarizers).

The results are shown below:

|  | 25° C. | 35° C. |
| --- | --- | --- |
| Response time (μsec) | 280 | 110 |
| Ps (nC/cm$^2$) | 24.2 | 15.1 |

Further, the device was driven at 25° C. to provide a contrast of 12, and a clear switching action was observed.

COMPARATUVE EXAMPLE 1

A ferroelectric liquid crystal device was prepared in the same manner as in Example 1 except that the liquid crystal composition A prepared in Example 1 was injected into a cell. The measured values of Ps and the response time of the device were as follows:

|  | 25° C. | 35° C. |
| --- | --- | --- |
| Response time (μsec) | 430 | 150 |
| Ps (nC/cm$^2$) | 36.5 | 26.2 |

As is understood from the comparison between Example 1 and Comparative Example 1, a ferroelectric liquid crystal device containing the liquid crystal composition according to the present invention showed a lower viscosity (about 1/2 at 25° C. from the above-mentioned equation $\tau=\eta/(Ps \cdot E)$) in spite of a higher upper limit temperature of SmC* phase. The ferroelectric liquid crystal device of the present invention further showed improved dynamic characteristic and high-speed responsiveness at low temperatures in contradiction with the magnitude of spontaneous polarization, and also provided a remarkably improved temperature-dependence of the response speed.

EXAMPLE 2

A liquid crystal composition C was prepared in the same manner as in Example 1 except that Example compounds No 4 and No. 12 were replaced by 2.5 wt. parts and 7.5 wt. parts, respectively, of Example compounds Nos. 5 and 15 showing the following phase transition series:

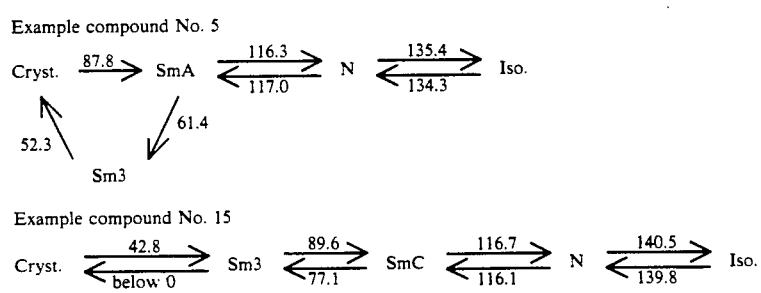

A ferroelectric liquid crystal device was prepared in the same manner as in Example 1 except for using the composition C. In the ferroelectric liquid crystal device, a monodomain of a uniform alignment characteristic was observed. The ferroelectric liquid crystal device was subjected to measurement of response time and spontaneous polarization Ps in the same manner as in Example 1, whereby the following results were obtained.

|  | 25° C. | 35° C. |
| --- | --- | --- |
| Response time (μsec) | 290 | 125 |
| Ps (nC/cm²) | 23.5 | 13.8 |

Further, the device was driven at 25° C. to provide a contrast of 11, a clear switching action was observed, and good bistability was shown after the termination of the voltage application.

EXAMPLE 3

A liquid crystal composition D was prepared in the same manner as in Example 1 except that Example compounds No 4 and No. 12 were replaced by 10 wt. parts and 5 wt. parts, respectively, of Example compounds Nos. 14 and 30 showing the following phase transition series:

Phase transition temperatures (°C.)

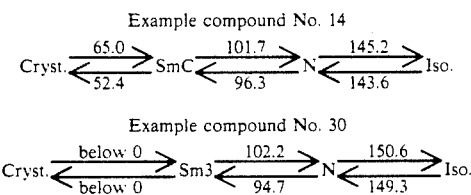

A ferroelectric liquid crystal device was prepared in the same manner as in Example 1 except for using the composition D. In the ferroelectric liquid crystal device, a monodomain of a uniform alignment characteristic was observed. The ferroelectric liquid crystal device was subjected to measurement of response time and spontaneous polarization Ps in the same manner as in Example 1, whereby the following results were obtained.

|  | 25° C. | 35° C. |
| --- | --- | --- |
| Response time (μsec) | 270 | 95 |
| Ps (nC/cm²) | 24.8 | 16.9 |

Further, the device was driven at 25° C. to provide a contrast of 14, a clear switching action was observed, and good bistability was shown after the termination of the voltage application.

EXAMPLE 4

A liquid crystal composition E was prepared in the same manner as in Example 1 except that Example compounds No 12 was replaced by 3.3 wt. parts of Example compound No. 27 showing the following phase transition series:

Phase transition temperatures (°C.)

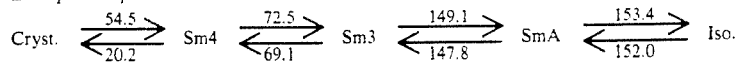

A ferroelectric liquid crystal device was prepared in the same manner as in Example 1 except for using the composition E. In the ferroelectric liquid crystal device, a monodomain of a uniform alignment characteristic was observed. The ferroelectric liquid crystal device was subjected to measurement of response time and spontaneous polarization Ps in the same manner as in Example 1, whereby the following results were obtained.

|  | 25° C. | 35° C. |
| --- | --- | --- |
| Response time (μsec) | 265 | 100 |
| Ps (nC/cm²) | 23.6 | 14.2 |

Further, the device was driven at 25° C. to provide a contrast of 11, a clear switching action was observed, and good bistability was shown after the termination of the voltage application.

EXAMPLE 5

A liquid crystal composition F was prepared in the same manner as in Example 1 except that Example compounds No 4 and No. 12 were replaced by 10 wt. parts of Example compound No. 14.

A ferroelectric liquid crystal device was prepared in the same manner as in Example 1 except for using the composition F. In the ferroelectric liquid crystal device, a monodomain of a uniform alignment characteristic was observed. The ferroelectric liquid crystal device was subjected to measurement of response time and spontaneous polarization Ps in the same manner as in Example 1, whereby the following results were obtained.

|  | 25° C. | 35° C. |
| --- | --- | --- |
| Response time (μsec) | 300 | 115 |
| Ps (nC/cm²) | 25.5 | 16.1 |

Further, the device was driven at 25° C. to provide a contrast of 13, a clear switching action was observed, and good bistability was shown after the termination of the voltage application.

EXAMPLE 6

A liquid crystal composition G was prepared in the same manner as in Example 1 except that Example compounds No 4 and No. 12 were replaced by 3.3 wt. parts and 6.7 wt. parts, respectively, of Example compounds Nos. 19 and 21 showing the following phase transition series:

Phase transition temperatures (°C.)

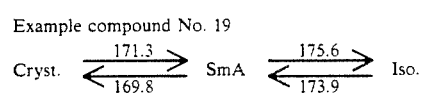

Example compound No. 21

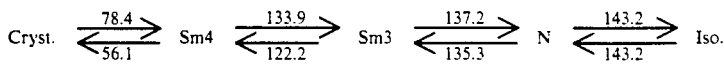

A ferroelectric liquid crystal device was prepared in the same manner as in Example 1 except for using the composition G. In the ferroelectric liquid crystal device, a monodomain of a uniform alignment characteristic was observed. The ferroelectric liquid crystal device was subjected to measurement of response time and spontaneous polarization Ps in the same manner as in Example 1, whereby the following results were obtained.

|  | 25° C. | 35° C. |
| --- | --- | --- |
| Response time (μsec) | 280 | 100 |
| Ps (nC/cm$^2$) | 23.3 | 13.5 |

Further, the device was driven at 25° C. to provide a contrast of 11, a clear switching action was observed, and good bistability was shown after the termination of the voltage application.

EXAMPLE 7

A liquid crystal composition H was prepared in the same manner as in Example 1 except that Example compounds No 4 and No. 12 were replaced by 5 wt. parts of Example compound No. 37 showing the following phase transition series:
Phase transition temperatures (°C.):

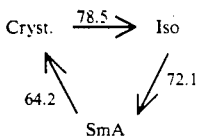

A ferroelectric liquid crystal device was prepared in the same manner as in Example 1 except for using the composition H. In the ferroelectric liquid crystal device, a monodomain of a uniform alignment characteristic was observed. The ferroelectric liquid crystal device was subjected to measurement of response time and spontaneous polarization Ps in the same manner as in Example 1, whereby the following results were obtained.

|  | 25° C. | 35° C. |
| --- | --- | --- |
| Response time (μsec) | 320 | 135 |
| Ps (nC/cm$^2$) | 24.9 | 14.1 |

Further, the device was driven at 25° C. to provide a contrast of 12, a clear switching action was observed, and good bistability was shown after the termination of the voltage application.

EXAMPLE 8

A liquid crystal composition I was prepared by mixing the following Example compounds in the respectively indicated amounts.

| Example Compound No. | Weight parts |
| --- | --- |
| (5-2) | 25 |
| (5-1) | 25 |
| (5-3) | 50 |

A liquid crystal composition J was prepared in the same manner as in preparation of the liquid crystal composition B except that the liquid crystal composition A was replaced by the liquid crystal composition I. The liquid crystal composition J in place of the liquid crystal composition B was charged in a cell in the same manner as in Example 1 to prepare a ferroelectric liquid crystal device, which was then subjected to measurement of a response time in the same manner as in Example 1. The results are shown below.

|  | 25° C. | 35° C. | 50° C. |
| --- | --- | --- | --- |
| Response time (μsec) | 620 | 390 | 200 |

COMPARATIVE EXAMPLE 2

A ferroelectric liquid crystal device was prepared in the same manner as in Example 1 except that the liquid crystal composition B was replaced by the liquid crystal composition I prepared in Example 8. The device was then subjected to measurement of a response time in the same manner as in Example 1. The results are shown below.

|  | 25° C. | 35° C. | 50° C. |
| --- | --- | --- | --- |
| Response time (μsec) | 730 | 510 | 230 |

EXAMPLE 9

A liquid crystal composition K was prepared in the same manner as in Example 2 except that the liquid crystal composition A used therein was replaced by the liquid crystal composition I prepared in Example 8.

A ferroelectric liquid crystal composition device was prepared by using the liquid crystal composition K otherwise in the same manner as in Example 1, and the optical response time thereof was measured in the same manner as in Example 1. The results are shown below.

|  | 25° C. | 35° C. | 50° C. |
| --- | --- | --- | --- |
| Response time (μsec) | 640 | 405 | 210 |

As apparent in view of the results of Examples 1–9 and Comparative Examples 1 and 2, the liquid crystal compositions B–H, J and K according to the present invention containing an optically inactive mesomorphic compound having a cyclohexane ring in their skeleton showed a remarkably improved low-temperature operation characteristic and a smaller temperature-dependence of response speed compared with the liquid crystal compositions A and I not containing such a mesomorphic compound.

EXAMPLE 10

A liquid crystal composition L was prepared by mixing the following Example compounds in the respectively indicated amounts.

| Example Compound No. | weight parts |
|---|---|
| (3-1) | 80 |
| (4-1) | 20 |

85 wt. parts of the liquid crystal composition L was further mixed with Example compounds Nos. 30 and 42 in amounts of 10 wt. parts and 5 wt. parts, respectively, to prepare a liquid crystal composition M.

A ferroelectric liquid crystal device was prepared in the same manner as in Example 1 except for using the composition M. In the ferroelectric liquid crystal device, a monodomain of a uniform alignment characteristic was observed. The ferroelectric liquid crystal device showed the following optical response data.

|  | 25° C. | 35° C. | 45° C. |
|---|---|---|---|
| Response time (msec) | 3.80 | 2.05 | 1.35 |

A clear switching action was observed, and good bistability was shown after the termination of voltage application.

COMPARATIVE EXAMPLE 3

A ferroelectric liquid crystal device was prepared in the same manner as in Example 1 except for charging the liquid crystal composition L prepared in Example 10 without further mixing into a cell. The device showed the following optical response data.

|  | 25° C. | 35° C. | 45° C. |
|---|---|---|---|
| Response time (msec) | 5.10 | 2.75 | 1.70 |

As apparent in view of the results of Examples 10 and 11 and Comparative Example 3, the liquid crystal compositions M and N according to the present invention containing a mesomorphic compound having a cyclohexane ring in their skeleton showed particularly an improved low-temperature operation characteristic and a slightly smaller temperature-dependence of response speed compared with the liquid crystal composition L not containing such a mesomorphic compound.

EXAMPLE 11

A liquid crystal composition N was prepared by mixing 90 wt. parts of the liquid crystal composition L prepared in Example 10 with 7 wt. parts of Example compound No. 40 and 3 wt. parts of Example compound No. 56.

A ferroelectric liquid crystal device was prepared in the same manner as in Example 1 except for using the composition N. In the ferroelectric liquid crystal device, a monodomain of a uniform alignment characteristic was observed. The ferroelectric liquid crystal device showed the following optical response data.

|  | 25° C. | 35° C. | 45° C. |
|---|---|---|---|
| Response time (msec) | 3.95 | 2.10 | 1.40 |

A clear switching action was observed, and good bistability was shown after the termination of voltage application.

EXAMPLE 12

A liquid crystal composition O was prepared by mixing the following Example compounds in the respectively indicated amounts.

| Example Compound No. | weight parts |
|---|---|
| (5-5) | 20 |
| (5-7) | 30 |
| (5-9) | 30 |
| (2-8) | 15 |
| (2-14) | 5 |

88 wt. parts of the liquid crystal composition O was further mixed with Example compounds Nos. 42 and in amounts of 8 wt. parts and 4 wt. parts, respectively, to prepare a liquid crystal composition P.

A ferroelectric liquid crystal device was prepared in the same manner as in Example 1 except for using the composition P. In the ferroelectric liquid crystal device, a monodomain of a uniform alignment characteristic was observed. The ferroelectric liquid crystal device showed the following optical response data.

|  | 25° C. | 35° C. | 45° C. |
|---|---|---|---|
| Response time (μsec) | 260 | 195 | 140 |

A clear switching action was observed, and good bistability was shown after the termination of voltage application.

COMPARATIVE EXAMPLE 4

A ferroelectric liquid crystal device was prepared in the same manner as in Example 1 except for charging the liquid crystal composition O prepared in Example 12 without further mixing into a cell. The device showed the following optical response data.

|  | 25° C. | 35° C. | 45° C. |
|---|---|---|---|
| Response time (μsec) | 305 | 220 | 145 |

EXAMPLE 13

A liquid crystal composition Q was prepared by 90 wt. parts of the liquid crystal composition O with 4 wt. parts of Example compound No. 16 and 6 wt. parts of Example compound No. 30 instead of Example compounds Nos. 42 and 46 used in Example 12.

A ferroelectric liquid crystal device was prepared in the same manner as in Example 1 except for using the composition Q. In the ferroelectric liquid crystal device, a monodomain of a uniform alignment characteristic was observed. The ferroelectric liquid crystal device showed the following optical response data.

| | 25° C. | 35° C. | 45° C. |
|---|---|---|---|
| Response time (μsec) | 230 | 175 | 130 |

A clear switching action was observed, and good bistability was shown after the termination of voltage application.

As is apparent in view of the results of Examples 12, 13 and Comparative Example 4, the liquid crystal compositions P and Q according to the present invention containing a mesomorphic compound having a cyclohexane ring in their skeleton showed an improved low-temperature operation characteristic and a smaller temperature-dependence of response speed compared with the liquid crystal composition 0 not containing such a mesomorphic compound.

EXAMPLE 14

A ferroelectric liquid crystal device was prepared in the same manner as in Example 1 except that a 2 % aqueous solution of polyvinyl alcohol resin ("PVA-117", mfd. by Kuraray K.K.) was used instead of the 1.5 %-solution of polyimide resin precursor in dimethylformamide for preparation of a cell. As a result of measurement of optical response time in the same manner as in Example 1, the following results were obtained.

| | 25° C. | 35° C. |
|---|---|---|
| Response time (μsec) | 295 | 120 |

The contrast in the driving at 25° C. was 14.

EXAMPLE 15

A ferroelectric liquid crystal device was prepared in the same manner as in Example 1 except that an alignment control layer was prepared only with the polyimide resin and without using SiO$_2$ for preparation of a cell. As a result of measurement of optical response time in the same manner as in Example 1, the following results were obtained.

| | 25° C. | 35° C. |
|---|---|---|
| Response time (μsec) | 255 | 90 |

As is apparent in view of Examples 14 and 15 in comparison with Example 1, a device containing a ferroelectric liquid crystal composition according to the present invention similarly shows a remarkably improved low-temperature operation characteristic and a smaller temperature-dependence of response speed even in a different device structure.

As described hereinabove, according to the present invention, there are provided a ferroelectric liquid crystal composition and a ferroelectric liquid crystal device containing the composition, which shows a good switching characteristic, an improved low-temperature operation characteristic and a smaller temperature-dependence of response speed.

What is claimed is:

1. A liquid crystal composition comprising at least one compound represented by the formula [I] below and at least one compound represented by the formula [II] below:

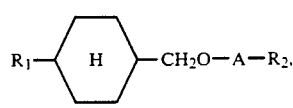

wherein R$_1$ denotes an alkyl group having 1-16 carbon atoms; R$_2$ denotes any one of alkyl group, alkoxy group, alkoxycarbonyl group, acyloxy group and alkoxycarbonyloxy group, each having 1-16 carbon atoms and optionally substituted with an alkyl or alkoxy group; and A denotes any one of

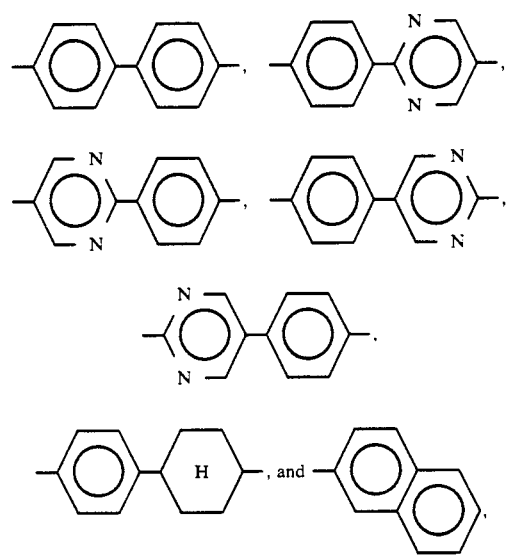

each optionally substituted with —F or —CN; and

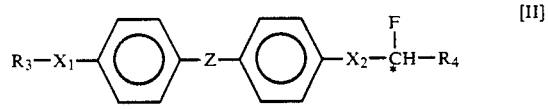

wherein R$_3$ denotes a linear alkyl group having 1-16 carbon atoms; R$_4$ denotes a linear alkyl group having 1-12 carbon atoms; X$_1$ is a single bond, —O—,

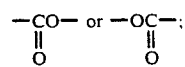

X$_2$ is —OCH$_2$—,

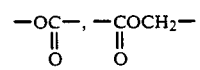

or —CH$_2$—; and Z is

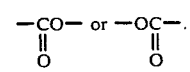

2. A composition according to claim 1, which further comprises at least one compound represented by any of the following formulas [III], [IV] and [V]:

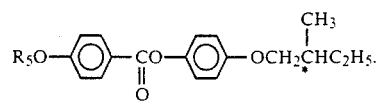 [III]
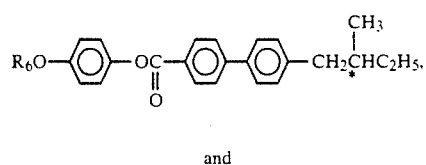 [IV]
and
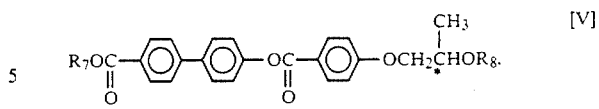 [V]
wherein $R_5$-$R_8$ respectively denote a linear alkyl group having 1-14 carbon atoms.
3. A liquid crystal device comprising a pair of electrode plates and a liquid crystal composition according to claims 1 or 2 disposed between the electrode plates.
* * * * *